(12) United States Patent
Chen et al.

(10) Patent No.: US 11,522,483 B2
(45) Date of Patent: Dec. 6, 2022

(54) LOW-LATENCY IMPEDANCE ESTIMATION FOR CONTROLLING A RELUCTANCE MOTOR

(71) Applicant: Apple Inc., Cupertino, CA (US)

(72) Inventors: Denis G. Chen, San Jose, CA (US); Juil Lee, Pleasanton, CA (US); Hari Vasudevan, Seattle, WA (US); Riccardo Tarelli, San Francisco, CA (US); Darya Amin-Shahidi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 17/033,578

(22) Filed: Sep. 25, 2020

(65) Prior Publication Data

US 2021/0175831 A1 Jun. 10, 2021

Related U.S. Application Data

(60) Provisional application No. 62/907,551, filed on Sep. 27, 2019.

(51) Int. Cl.
*H02P 25/092* (2016.01)
*H02P 25/086* (2016.01)
*G06F 3/01* (2006.01)

(52) U.S. Cl.
CPC ............ *H02P 25/092* (2016.02); *G06F 3/016* (2013.01); *H02P 25/086* (2013.01)

(58) Field of Classification Search
CPC .... H02P 25/092; H02P 25/086; H02P 25/034; G06F 3/016
USPC .................................................. 318/701, 700
See application file for complete search history.

(56) References Cited

U.S. PATENT DOCUMENTS

| | | |
|---|---|---|
| 6,388,417 B1 | 5/2002 | Keith |
| 6,495,985 B1 | 12/2002 | Mayes et al. |
| 7,638,967 B2 * | 12/2009 | Aizawa .................. H02P 21/34 |
| | | 318/431 |
| 9,188,648 B2 | 11/2015 | Eskola et al. |
| 2019/0158009 A1 | 5/2019 | Deguchi et al. |

* cited by examiner

*Primary Examiner* — David Luo
(74) *Attorney, Agent, or Firm* — Fish & Richardson P.C.

(57) ABSTRACT

A haptic system includes a haptic engine in which a reluctance motor is driven by a driver controller operated in conjunction with an impedance-estimator that uses amplitude-modulated calibration signals. An enveloped-calibration signal is superimposed on a haptic-drive signal to quickly, and accurately, estimate the driving coil's impedance, while minimizing power penalty.

19 Claims, 21 Drawing Sheets

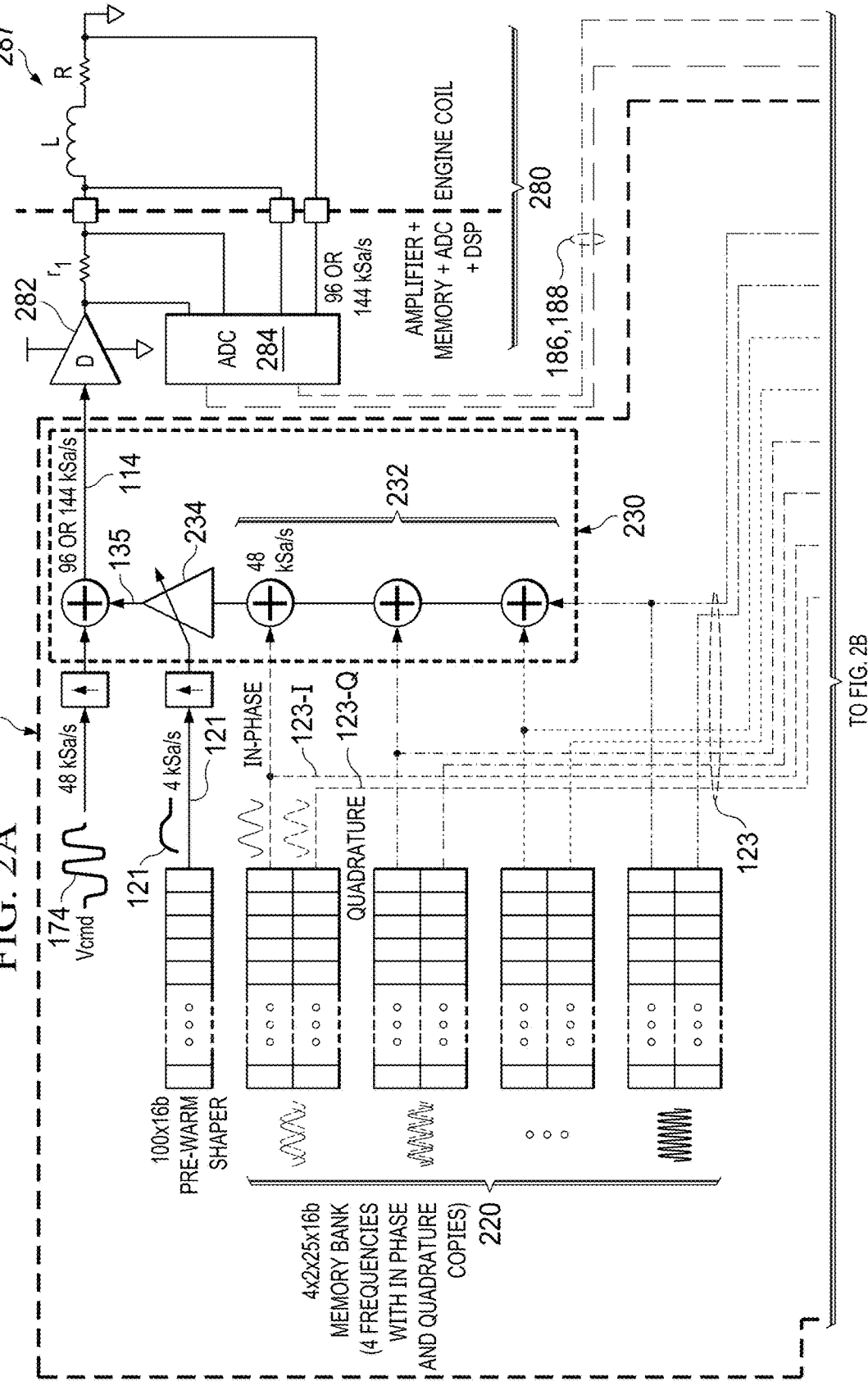

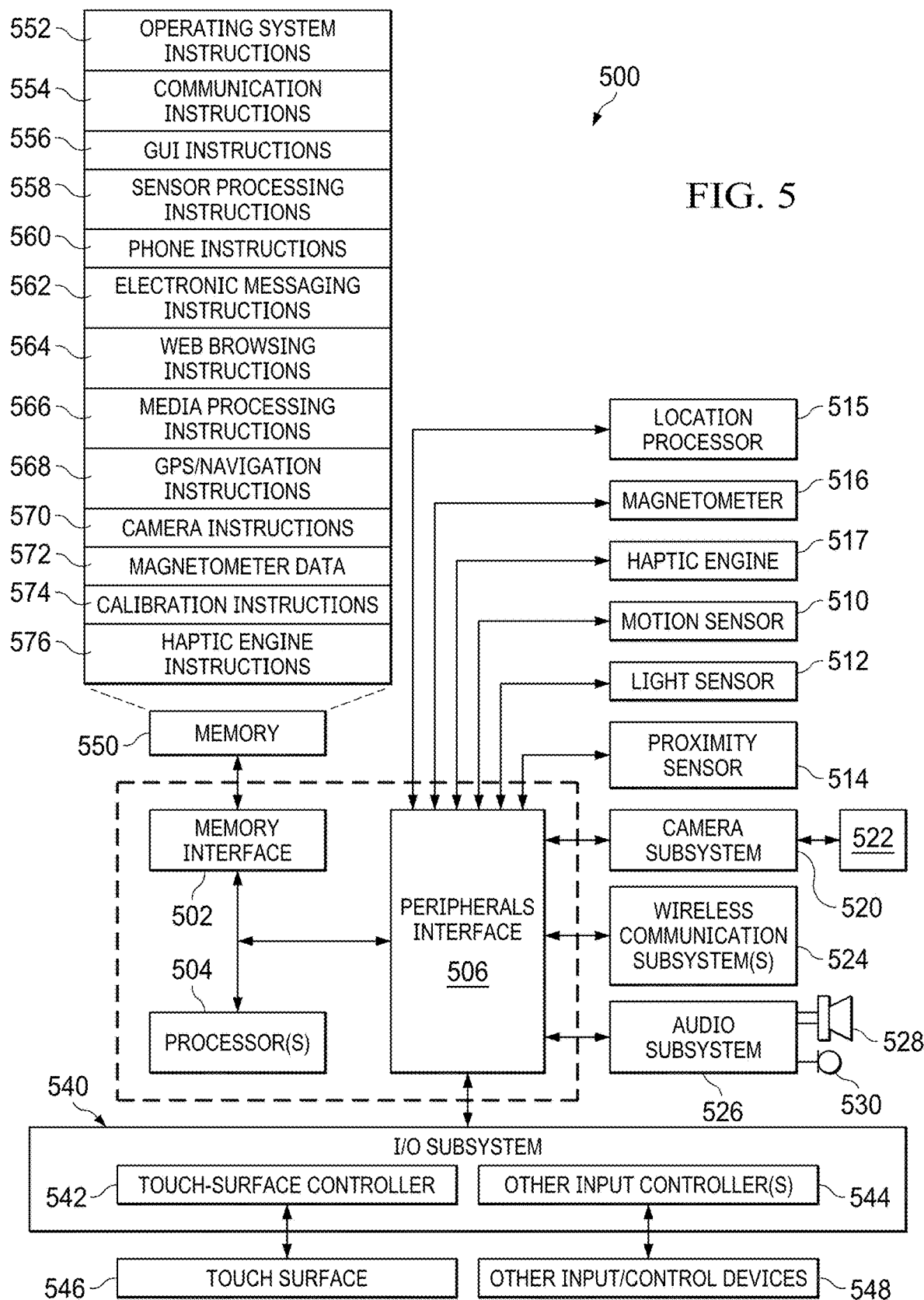

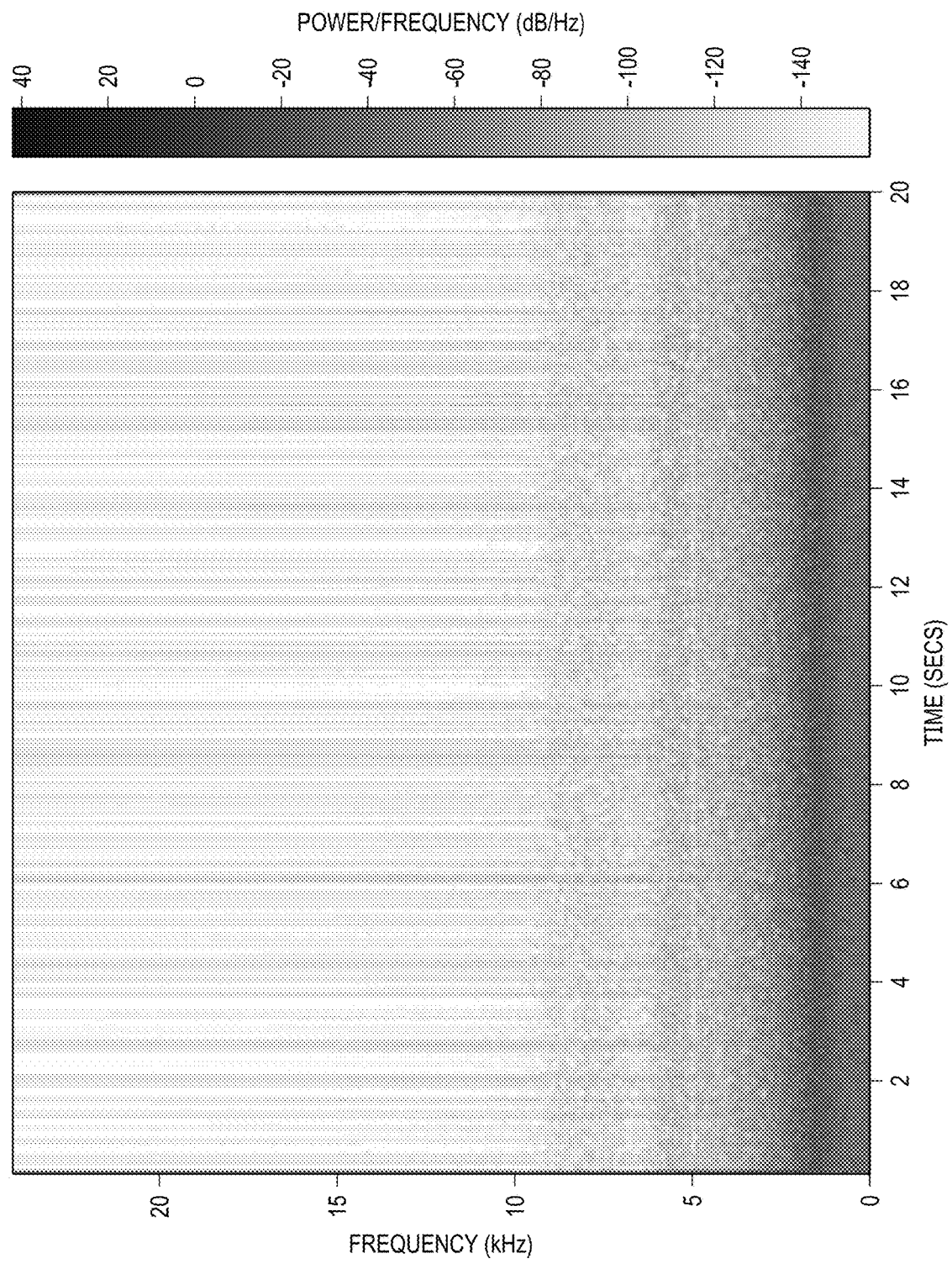

LOW-LATENCY IMPEDANCE ESTIMATION FOR CONTROLLING A RELUCTANCE MOTOR

BACKGROUND

Technical Field

This specification relates generally to haptic engine architectures, and more specifically, to a haptic engine architecture having a reluctance motor, referred to interchangeably as a gap-closing actuator, in which position of the actuator's moving mass is controlled based on real-time estimates of resistance and inductance of the actuator's driving coil.

Background

A haptic engine (also referred to as a vibration module) includes a haptic actuator in which a mass is driven using electromagnetic forces to move relative the haptic actuator's frame, at least, along a driving direction (e.g., through vibration back-and-forth along the driving direction). A haptic actuator can be implemented as a linear resonant actuator (LRA), a gap-closing actuator, a rotary actuator, etc. The haptic engine also includes circuitry for actuating the haptic actuator, e.g., to produce the electromagnetic forces responsible for moving the mass, and circuitry for determining one or more of acceleration, velocity and displacement of the moving mass and compare them with target acceleration, target velocity and target displacement, respectively.

FIGS. 6-7 show aspects of dynamics of a mass M of a gap-closing actuator. As shown in FIG. 6, the gap-closing actuator is represented as a combination of an electromagnetic system and a mechanical system that are coupled with each other. In this example, the electromagnetic system includes a stator that has a coil with an inductance L and a cross section $A_C$. Here, the stator is at rest relative a datum of the mechanical system. The electromagnetic system also includes a ferromagnetic rotor that has a mass M, and that is spaced apart by a gap g from the coil. The rotor, referred to interchangeably as attraction plate, is also part of the mechanical system. The attraction plate is movably coupled with the datum through a coupler that has a spring constant $K_S$ and a damping coefficient b.

Here, magnetic-flux dynamics of the electromagnetic system are coupled with spring-dampener dynamics of the mechanical system in the following manner. When a current of magnitude I, regardless of current direction, is driven through the coil, a magnetic flux $\lambda=LI$ is induced in the attraction plate, which in turn induces a driving force that moves the attraction plate to close the gap between the coil and the attraction plate. Here, L is the inductance of the coil. The coupler opposes the driving force and, thus, limits the range of the gap g. In this manner, the gap between the coil and the attraction plate of the reluctance motor varies in accordance with the following equation of motion:

$$\frac{d^2 g(t)}{dt^2} = -\frac{b}{M}\frac{dg(t)}{dt} - \frac{K_S}{M}g(t) + \left(\frac{g_0 K_S}{M} - \frac{\lambda^2}{2\mu_0 M n^2 A_C}\right). \quad (1)$$

In EQ. (1), $\mu_0$ is the permeability of the medium between the attraction plate and the coil, and n is the number of turns of the coil. Here, the "driving" term is a function of the magnetic flux $\lambda=LI$ produced by the coil through the attraction plate in the following manner:

$$F = \frac{\lambda^2}{2\mu_0 n^2 A_C} \quad (2)$$
$$= \frac{\mu_0 n^2 A_C}{2}\left(\frac{I}{g}\right)^2$$
$$= \frac{1}{2\mu_0 n^2 A_C}(LI)^2$$

In view of EQ. (2), the coil inductance L can be expressed as a ratio of a product of multiple parameters $\mu_0 n^2 A_C$, and the gap g:

$$L = \frac{\mu_0 n^2 A_C}{g}. \quad (3)$$

Thus, the gap between the coil and the attraction plate of the reluctance motor can be determined, based on EQ. (3), by calibrating the coil parameters n and $A_C$, and determining the coil inductance L.

An equivalent electrical circuit of the gap-closing actuator is shown schematically in FIG. 8. The equivalent electrical circuit includes the coil, and a driving source to provide a driving voltage V. Here, the coil has a resistance R and an inductance L connected in series with the driving source. Ohm's law for this equivalent electric circuit at a time instance is:

$$\frac{d\lambda(t)}{dt} = -\frac{R}{L}\lambda(t) + V_{drive}. \quad (4)$$

In accordance with EQ. (4), the driving source induces a current $$I = \frac{\lambda}{L}$$

through the coil. Here, the electrical circuit dynamics converge to first order dynamics under the assumption that the inductance L is relatively invariant during a click displacement, i.e., the term $$\frac{dL(t)}{dt}$$

is approximately equal to 0. This assumption is true when a "click displacement" is much shorter than the gap g. Under such assumptions, the coil inductance L can be obtained by sensing the voltage $V_{drive}$ across the coil, and the current I induced through the coil, as $$L = -\frac{V_{drive} - RI(t)}{\frac{dI}{dt}}. \quad (5)$$

Note that using this approach the coil inductance L sensing requires a-priori knowledge of the resistance of the coil under measurement.

Further note that most efficient actuators have a small gap g. Thus, the foregoing assumption relating to the relative size of the click displacement may be invalid, because the click displacement can be only slightly shorter than the gap g itself. For these efficient actuators, the coil inductance L changes during operation, in accordance with EQ. (3) because of the gap closing, such that, in EQ (4), the term $$\frac{dL(t)}{dt} \neq 0,$$

because $g(t)-g_o \neq 0$.

Additionally, the coil resistance R also changes during operation especially because of thermal effects. The coil resistance knowledge is usually obtained through factory calibration. However, factory calibration is sensitive to any changes happening during product lifetime, including temperature variations. For instance, the actual value of R is typically sensitive to the thermal effects caused by large driving currents during actuation. For copper coils, temperature variation can cause a resistance delta of ~0.4%/deg C., which would lead to an unusable measurement within a few deg C. variation from factory temperature.

Several solutions have been conventionally implemented to mitigate errors in obtaining the coil inductance L due to the noted temperature variations of the coil resistance. One solution makes use of an external temperature sensor to track coil temperature. However, coil temperature can be very difficult to track in real-time, i.e., with low latency, due to heat transfer time constant and losses between coil and sensor. Also, this solution relies on a precise knowledge of the coil temperature coefficient.

Another solution makes use, in real time, of an impedance-measurement tone, as shown in FIGS. 8A-8B. FIG. 8A shows a drive voltage having a soft-ramp pre-warm (SRPW) portion over a first time interval, and a playback (PB) portion over a second time interval subsequent to the first time interval. The drive voltage is used to drive the actuator's driving coil to generate haptic playback. An amplitude $A_{PB}$ of the PB portion of the drive voltage can typically be as high as 8V. FIG. 8B shows a low-amplitude, ~50 mV, high-frequency, >1 kHz, calibration tone. Here, amplitude $A_C$ of the calibration tone is the same over both time intervals corresponding to the respective SRPW portion and PB portion of the drive voltage. As part of this technique for estimating the impedance of the driving coil, the calibration tone is superimposed on a drive voltage.

The coil resistance R and the coil induction L are extracted from voltage and current monitor, i.e., post-ADC, by windowed, ~100 ms, FFT spectrograms. A few drawbacks for this solution are enumerated below.

First, the calibration tone amplitude $A_C$ must be low to avoid large power draw during the PB portion when the drive voltage is high. This limits the signal-to-noise ratio (SNR) of impedance estimation. A very low bandwidth, ~10 Hz, filter, e.g., FFT or otherwise, is applied to achieve acceptable accuracy, e.g., <2%. This can be tolerated under steady state operation since the driving coil's resistance drift is dominated by temperature change and this phenomenon is bandwidth limited, typically <2° C./sec. But such bandwidth limit is detrimental to short time-window waveforms, such as haptic taps. The low bandwidth filtering takes a long time to reach steady state, e.g., on the order of 100's of milliseconds. As such, at audio amplifier-sampling rates in the range of 48-96 kHz, the measurement needs long settling time to achieve good SNR. This latency will delay waveform playback and lead to poor user experience, e.g., to time-lagged haptic feedback.

Second, the calibration tone is typically in the audible range, causing an undesirable audible tone during the playback. Third, the resistance estimation tone will also increase power consumption without any force increase to the desired haptic playback. Fourth, since the impedance estimation is made from a single tone, its accuracy depends on the group delay error between voltage and current monitors.

SUMMARY

In accordance with the disclosed technologies, a haptic system includes a haptic engine in which a reluctance motor is driven by a driver controller operated in conjunction with an impedance-estimator that uses amplitude-modulated calibration signals. An enveloped-calibration signal is superimposed on a haptic-drive signal to quickly, and accurately, estimate the driving coil's impedance, while minimizing power penalty. The envelope has high amplitude, to produce a high-power portion of the calibration signal, when a drive voltage is zero, e.g., during a soft ramp pre-warm portion thereof. This high power portion of the calibration signal (1) lifts the SNR of the impedance estimation, and (2) causes quick convergence on an accurate impedance estimation. When the drive voltage amplitude becomes large, e.g., during a playback portion of the drive voltage, the calibration signal is enveloped down to small amplitudes in order to avoid excessive power consumption.

In general, one innovative aspect of the subject matter described in this specification can be embodied as a haptic system that includes an impedance-estimator module configured to communicate with a haptic engine and with a driver controller; receive, from the driver controller, a drive signal comprising a pre-warm portion followed by a playback portion, and, from the haptic engine, a monitoring voltage signal and a monitoring current signal; and supply a modified driver signal to the haptic engine, while receiving the pre-warm portion, estimate values of resistance and inductance of a driving coil of the haptic actuator, and supply the values of the resistance and the inductance to the driver controller for adjusting at least the playback portion of the drive signal. The impedance-estimator module includes a) signal-generator circuitry configured to generate an amplitude-modulated calibration signal comprising one or more tones, wherein each tone is a signal having a respective frequency; modify the drive signal by adding the amplitude-modulated calibration signal to the drive signal. Here, the amplitude-modulated calibration signal has a first amplitude when the amplitude-modulated calibration signal is added to the pre-warm portion of the drive signal, a second amplitude smaller by a predetermined factor than the first amplitude when the amplitude-modulated calibration signal is added to the playback portion of the drive signal, and zero, one or more other amplitudes that (i) differ from the first and second amplitudes, and (ii) depend on a drive amplitude of the drive signal. The impedance-estimator module further includes b) down-converter circuitry configured to, for each tone of the amplitude-modulated calibration signal, down-convert the current signal and the voltage signal based on the tone; c) phasor-constructor circuitry configured to, for each tone of the amplitude-modulated calibration signal, obtain a corresponding complex impedance phasor as a ratio of the down-converted voltage signal and the down-converted current signal, and d) modeler-circuitry configured to compute the resistance and the inductance of the driving coil by fitting the one or more impedance phasors to a frequency-dependent model of impedance of the driving coil.

Other embodiments of this aspect include corresponding computing devices, each configured to perform operations or actions based on signals output by the disclosed haptic engine. For a device to be configured to perform particular operations or actions means that the device has installed on it software, firmware, hardware, or a combination of them that in operation cause the device to perform the operations or actions. The foregoing and other embodiments can each optionally include one or more of the following features, alone or in combination.

Another innovative aspect of the subject matter described in this specification can be embodied as a method that includes generating an amplitude-modulated calibration signal comprising one or more tones, wherein each tone is a signal having a respective frequency; receiving, from a driver controller, a drive signal comprising a pre-warm portion followed by a playback portion; modifying the drive signal by adding the amplitude-modulated calibration signal to the drive signal. The amplitude-modulated calibration signal has a first amplitude when the amplitude-modulated calibration signal is added to the pre-warm portion of the drive signal, and one or more second amplitudes that are smaller by respective predetermined factors than the first amplitude when the amplitude-modulated calibration signal is added to the playback portion of the drive signal, where the one or more second amplitudes of the calibration signal depend on a drive amplitude of the drive signal. The method further includes supplying the modified drive signal to a haptic actuator; while receiving the pre-warm portion, estimating resistance and inductance of a driving coil of the haptic actuator by i) receiving, from the haptic actuator, a current signal through, and a voltage signal across, the driving coil; for each tone of the amplitude-modulated calibration signal, ii) down-converting the current signal and the voltage signal based on the tone, and iii) obtaining a corresponding impedance phasor as a ratio of the down-converted voltage signal and the down-converted current signal; iv) computing the resistance and the inductance of the driving coil by fitting the one or more impedance phasors to a frequency-dependent model of impedance of the driving coil; and v) providing the resistance and the inductance of the driving coil to the driver controller for adjusting at least the playback portion of the drive signal.

The subject matter described in this specification can be implemented in particular embodiments so as to realize one or more of the following advantages. For example, because the calibration signal can include multiple tones, the impedance estimation is indifferent to any group delay error between voltage and current monitors. As another example, the disclosed approach uses a simple low-pass filter and discrete Fourier transform (DFT) instead of using a windowed FFT, which reduces computational load.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is an example mobile device architecture that uses a haptic system, according to a disclosed embodiment.

FIGS. 9A-9D show aspects of determining error source for estimating impedance of a driving coil of a haptic actuator.

Like reference numbers and designations in the various drawings indicate like elements.

DETAILED DESCRIPTION

This specification relates generally to haptic engine architectures, and more specifically, to a haptic engine architecture having a reluctance motor, referred to interchangeably as a gap-closing actuator, in which position of the actuator's moving mass is controlled based on real-time estimates of resistance and inductance of the actuator's driving coil.

Figure 8A:
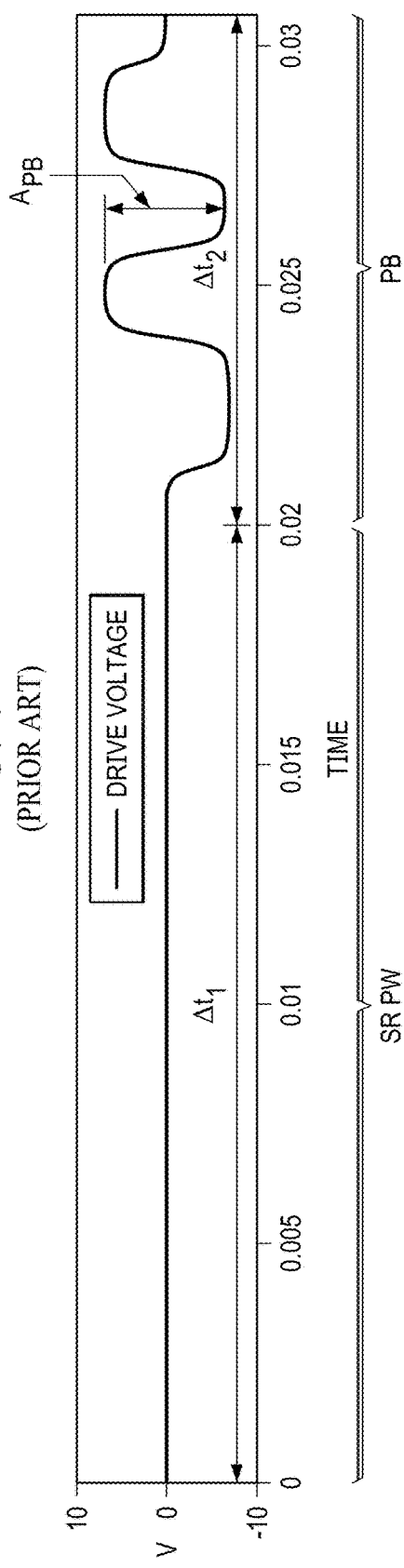
FIGS. 8A-8B show a drive voltage for driving a haptic actuator, and a calibration tone to be superimposed on the drive voltage to estimate conventionally impedance of a driving coil of a haptic actuator.
Figure 8B:
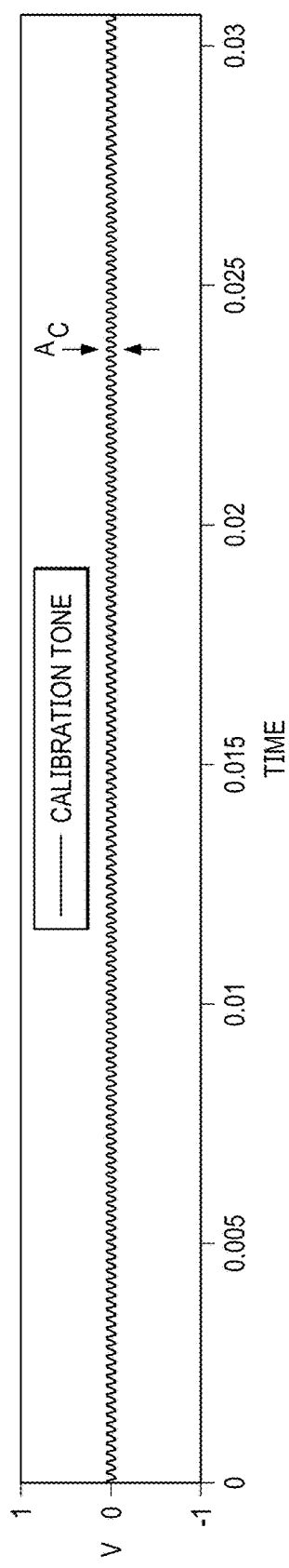
Figure 9A:
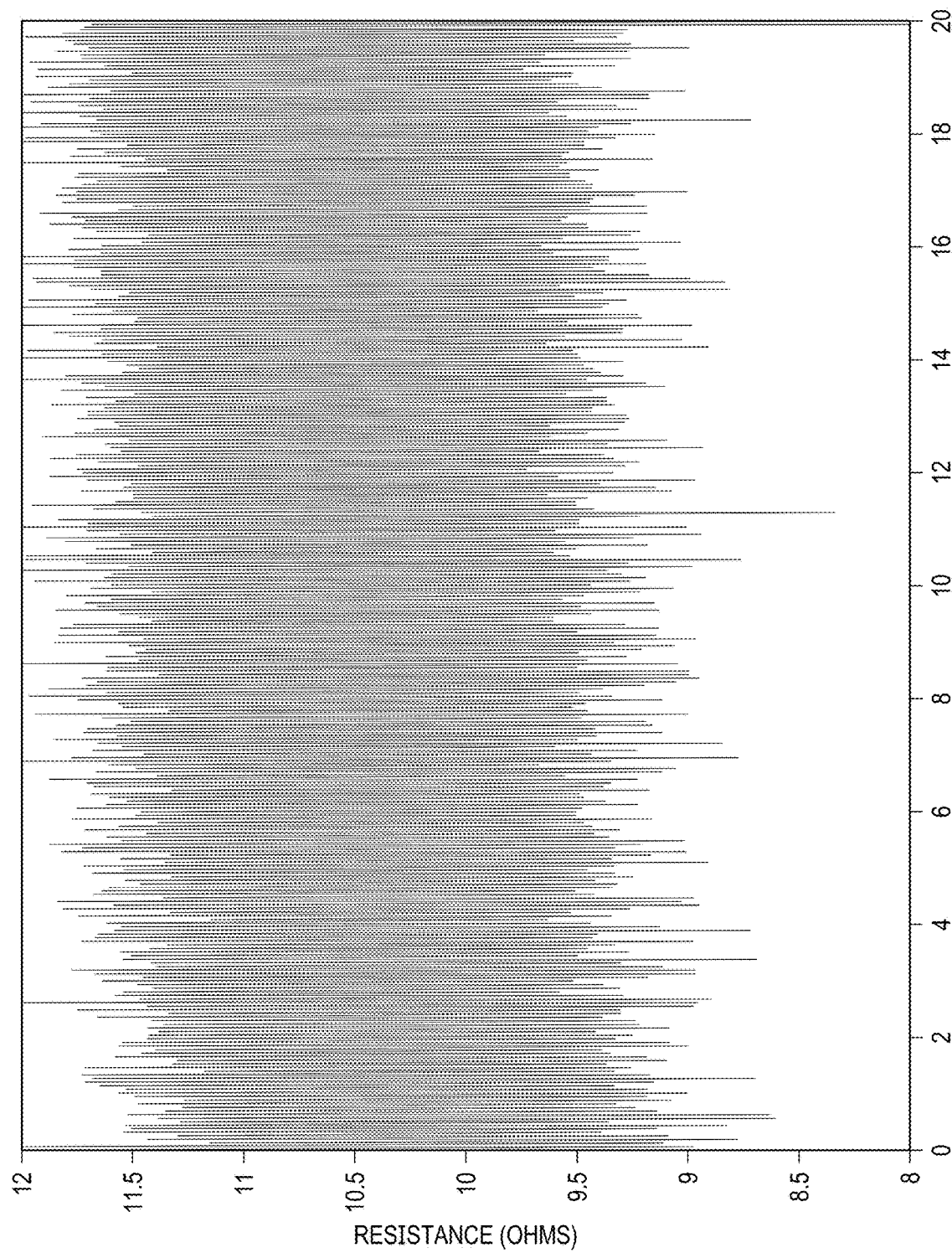
Figure 9B:
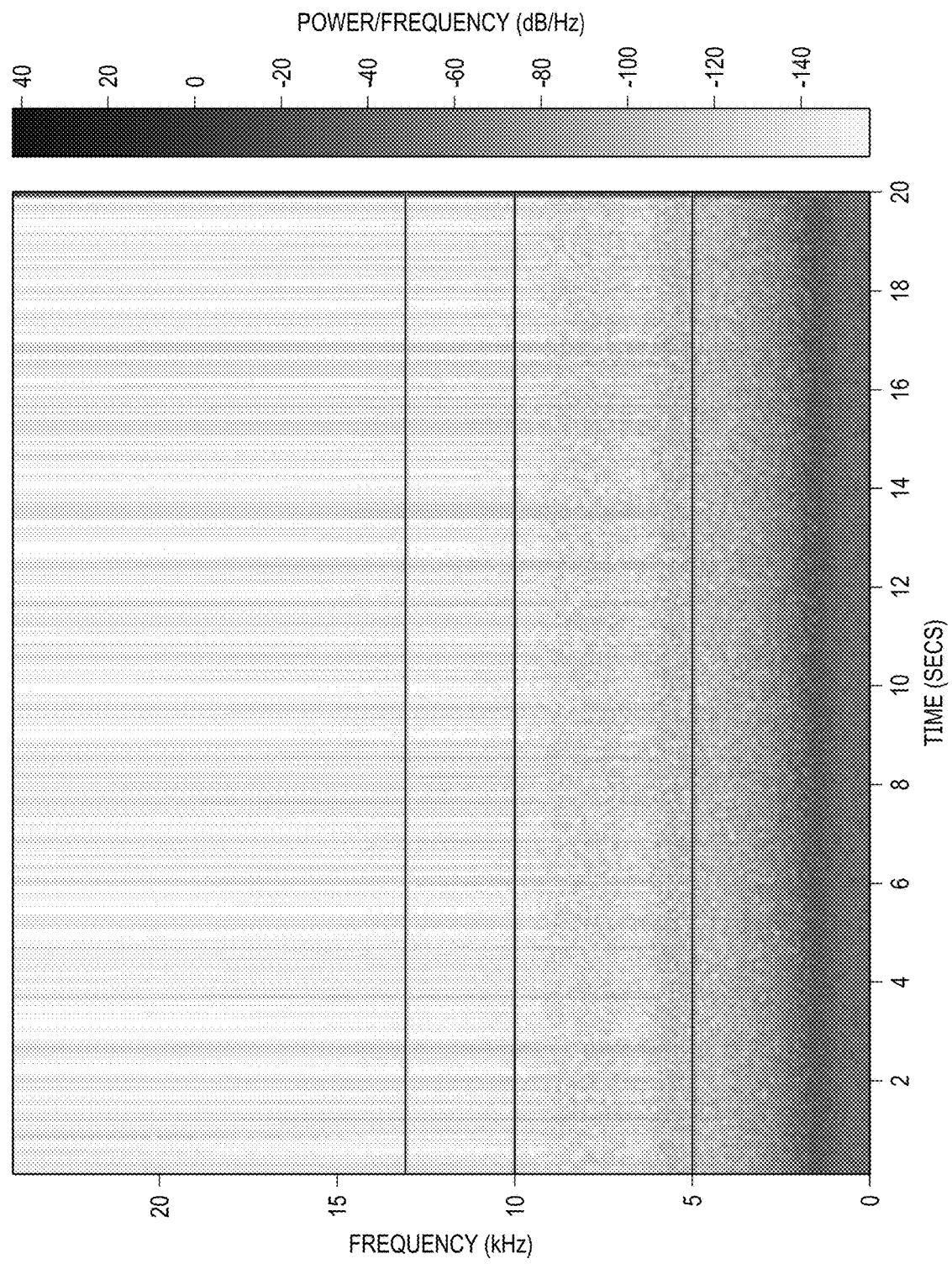
Figure 9D:
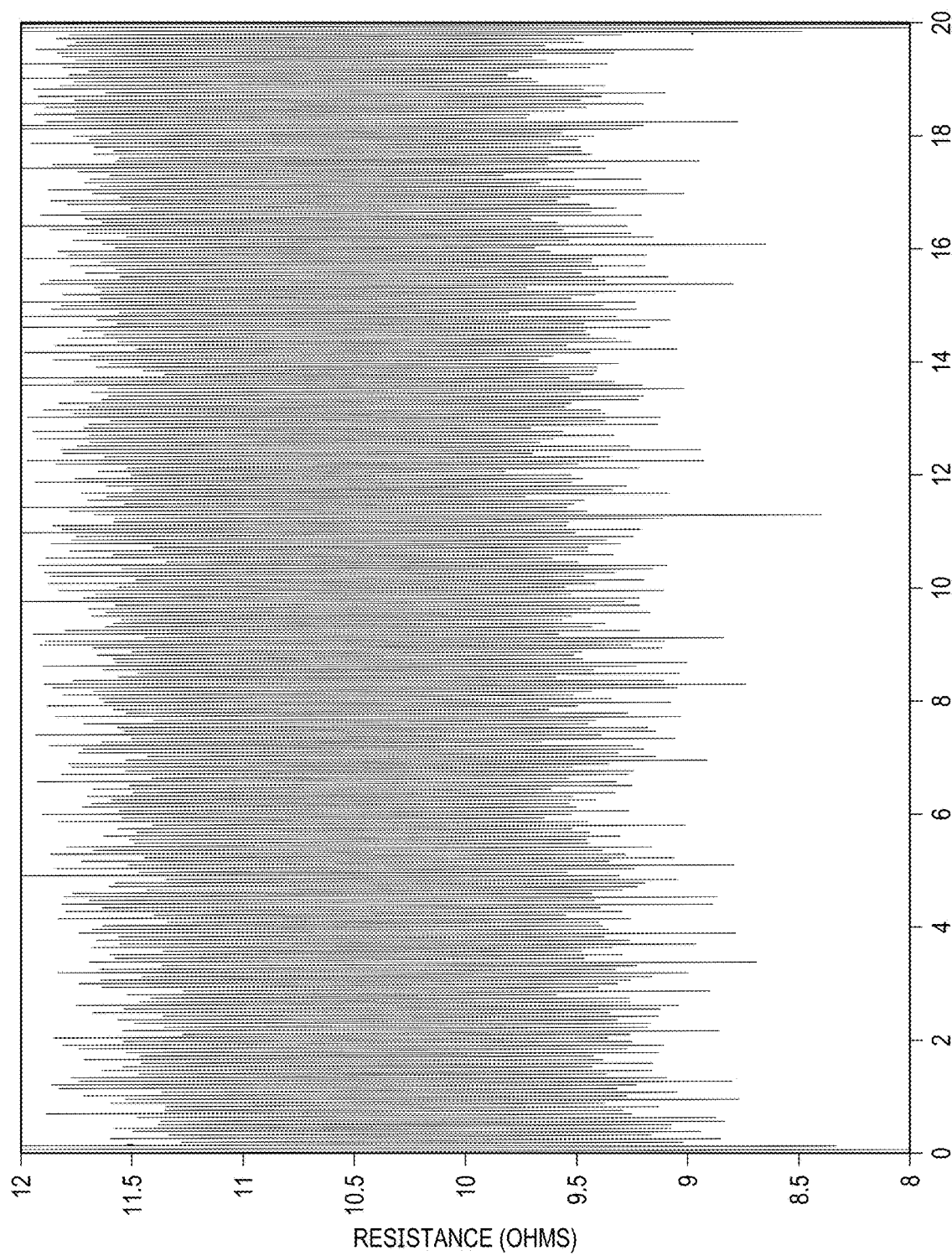

Prior to describing the systems and techniques that enable low-latency, real-time estimation of the driving coil's impedance, the error source(s) and SNR requirements are discussed first. It will be shown that the resistance estimation error is predominantly pink (1/f) and white noise. FIGS. 9A-9D show aspects of determining error source for estimating impedance of a driving coil of a haptic actuator. FIG. 9A is a waveform resulting from estimating resistance of a driving coil using a calibration tone having a 50 mV amplitude, as described above in connection with FIGS. 8A-8B. FIG. 9B is a spectrogram of the waveform from FIG. 9A. The spectrogram shown in FIG. 9B can be processed to notch out features of the spectrogram located at 0.8, 5, 10, 13 kHz. FIG. 9C shows the processed spectrogram. FIG. 9D shows a waveform corresponding to the processed spectrogram of FIG. 9C obtained via inverse FFT. When comparing the waveforms from FIGS. 9A and 9D, it is noted that there is no change in estimation error after notching out single frequency components. This comparison indicates that the error is random noise.

Figure 10A:
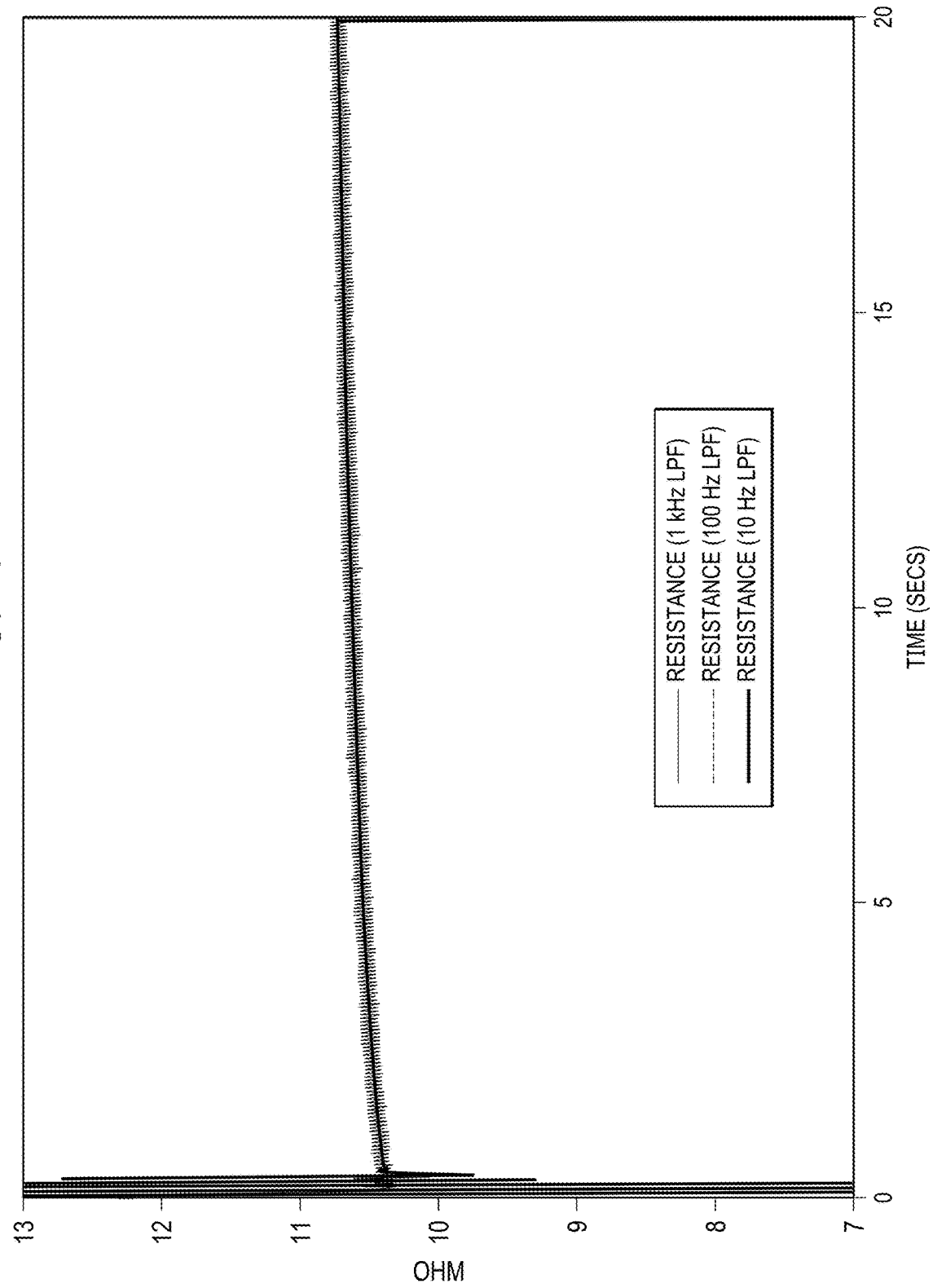
FIGS. 10A-10C show other aspects of determining error source for estimating impedance of a driving coil of a haptic actuator.
Figure 10B:
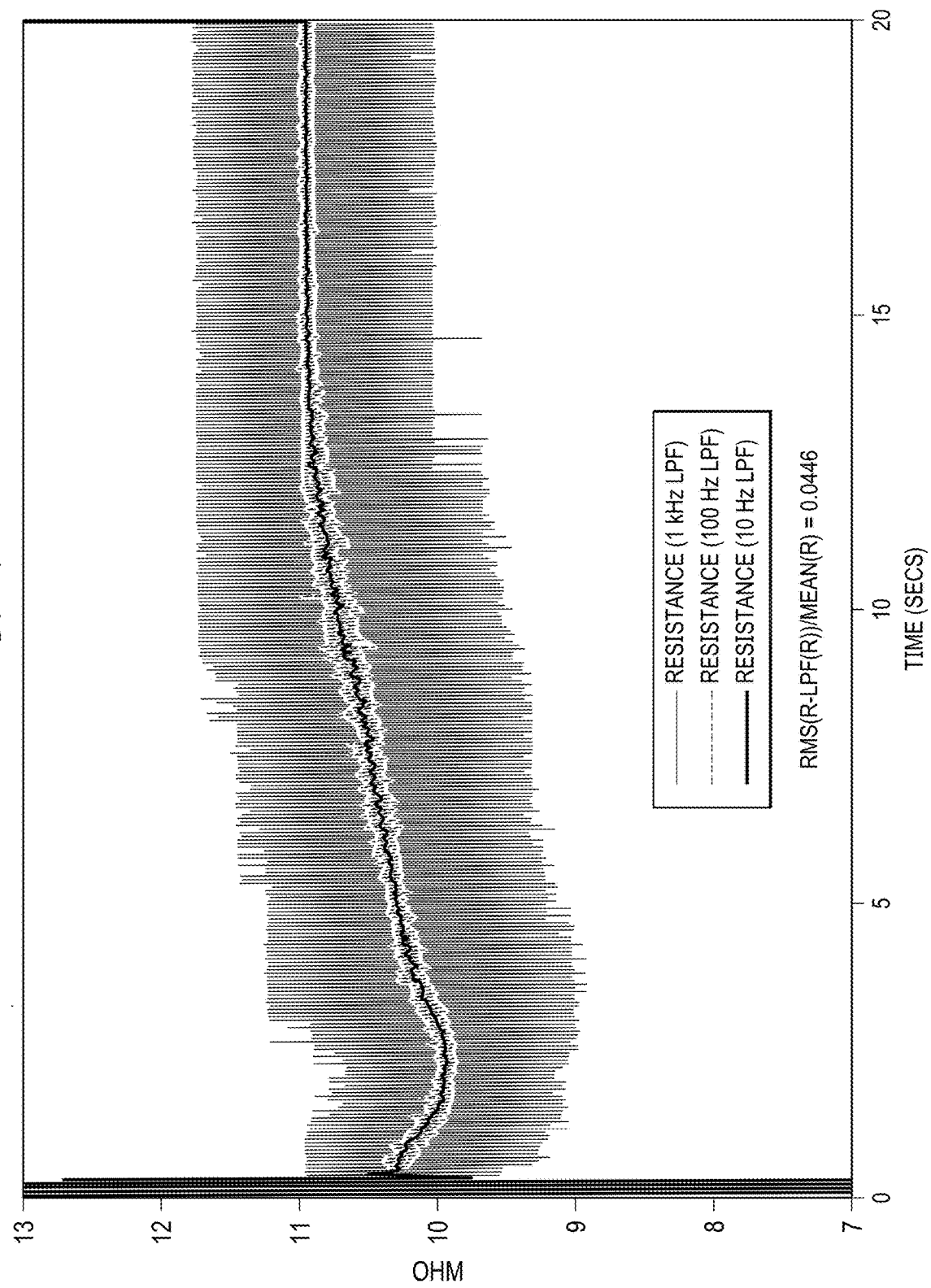
Figure 10C:
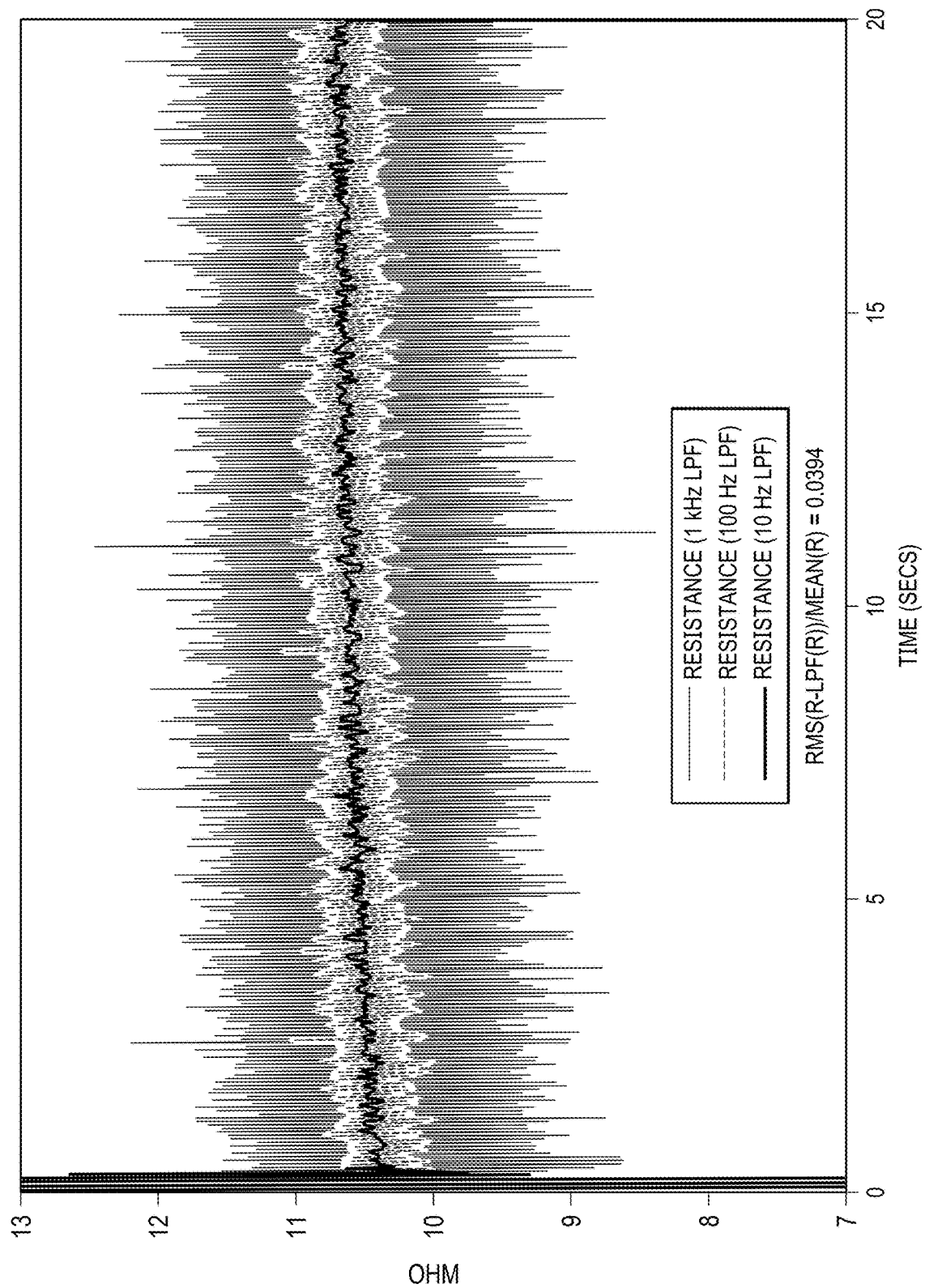

FIGS. 10A-10C show other aspects of determining error source for estimating impedance of a driving coil of a haptic actuator. FIG. 10A shows waveforms resulting from estimating resistance of a driving coil using 1.5V tones at 10 kHz, 15 kHz, and 20 kHz (48 kSa/s) on a class D amplifier with built-in current and voltage monitor ADC. The fit is to R+jωL. The load is a generic linear resonance actuator, which corresponds to 10Ω+160 µH nominal. FIG. 10B shows waveforms resulting from estimating resistance of a driving coil where a certain amount of white noise is added to the 1.5V tones calibration case to achieve SNR parity to if the measurement was made with 50 mV calibration tones. FIG. 10C shows waveforms resulting from estimating resistance of a driving coil using 0.5 mV tones at 10 kHz, 15 kHz, and 20 kHz (48 kSa/s) on the said class D amplifier. The fit is to R+jωL. The load is a generic linear resonance actuator, which corresponds to 10Ω+160 µH nominal. In each of FIGS. 10A-10C, a first waveform corresponds to resistance estimation results obtained when a 1 kHz low-pass filter (LPF) was applied on the resistance estimation; a second waveform corresponds to resistance estimation results obtained when a 100 Hz LPF was used; and a third waveform corresponds to resistance estimation results obtained when a 10 Hz LPF was used.

The figure of merit $$\frac{\text{rms}(R - LPF(R))}{\text{mean}(R)}$$

has a value of 0.0446 for the results shown in FIG. 10B, and a value of 0.0394 for the results shown in FIG. 10C. This shows that, adding a 50 mV calibration-tone equivalent amount of white noise to the 1.5V tone measurement yields comparable results to real 50 mV measurements. Also, the limited difference in 100 Hz and 10 Hz LPF results between model and measurement may be explained by 1/f noise in the baseband.

Moreover, in this example system, the resistance estimation error is dominated by the monitored-voltage $V_{mon}$ and monitored-current $I_{mon}$ idle noise, where $I_{mon}$ is noisier than $V_{mon}$, as shown in Table 1.

TABLE 1

| Variation | $V_{mon}$ | $I_{mon}$ | Comment |
|---|---|---|---|
| Idle noise (µVrms, µIrms) | 430 | 145 | Data sheet, Vmon noise is nominal, Imon noise is max |
| Expected quantization noise (µVrms, µIrms) | 108 | 15 | 16b, 12.3 V and 1.68A full scale |
| Normalized rms error $\left(\frac{\Delta V}{V}, \frac{\Delta I}{I}\right)$ | 0.0086 | 0.029 | 50 mV, 10 Ω |
| Normalized resistance rms error $\left(\frac{\Delta R}{R}\right)$ | 0.050 | | 150 µH, LMS regression (impedance ratio gain $\left(\frac{j\omega L}{R}\right)$ = 0.9441@10 kHz, 1.4993@15 kHz, 2.2765@20 kHz, or 2.8848 rms total) |

Here, datasheet $V_{mon}/I_{mon}$ accuracy is 0.2%. If ~50 mV calibration-tone is to be used (to keep added power consumption at peak output voltage ~0.1 W), $V_{mon}$ and $I_{mon}$ noise need to be reduced by ~30×, e.g. 1000× noise power reduction. This type of impedance estimation accuracy can be achieved using the technologies described below in this specification in connection with FIGS. 1A-1E and FIG. 2.

Figure 1A:
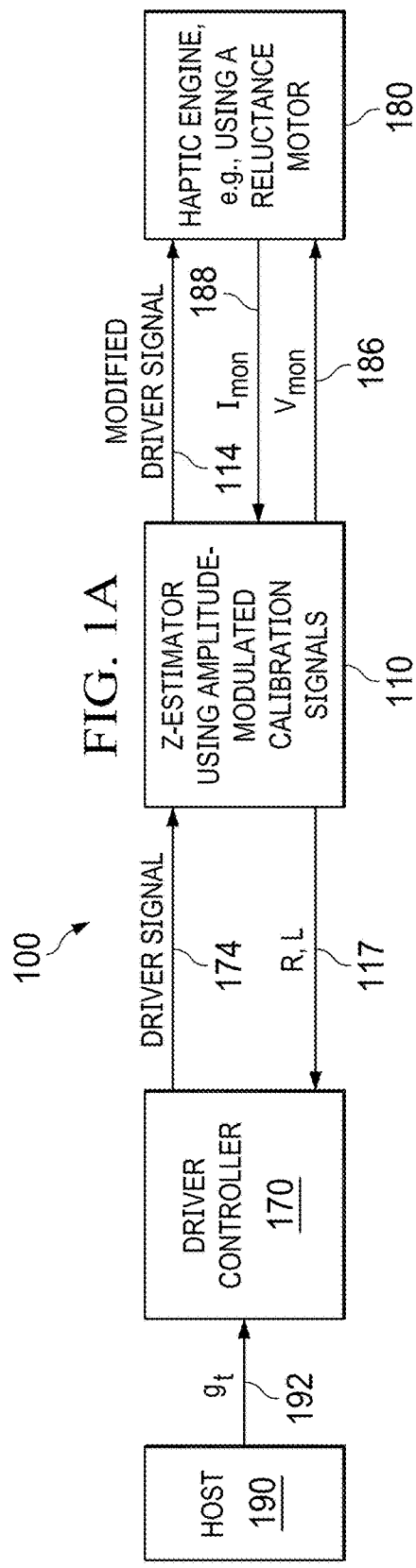
FIG. 1A shows an example of haptic architecture including an impedance-estimator that uses amplitude-modulated calibration signals in accordance with the disclosed technologies.
Figure 1B:
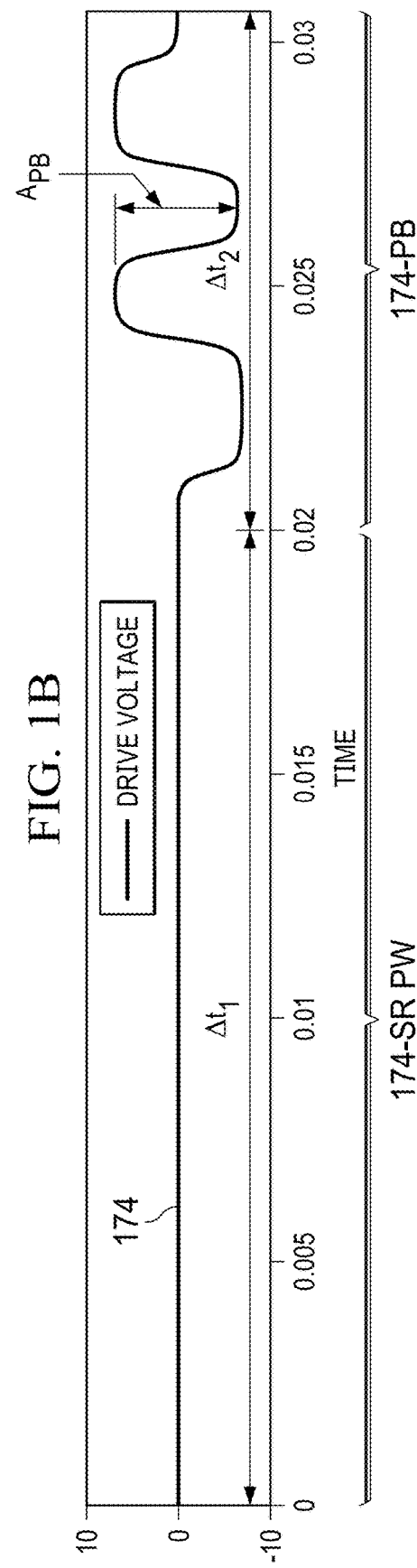
FIGS. 1B-1D show a drive voltage for driving a haptic actuator, an amplitude-modulated calibration voltage, and a modified drive voltage formed by superimposing the amplitude-modulated calibration voltage on the drive voltage for estimating impedance of a driving coil of the haptic actuator in accordance with the disclosed technologies.
Figure 6:
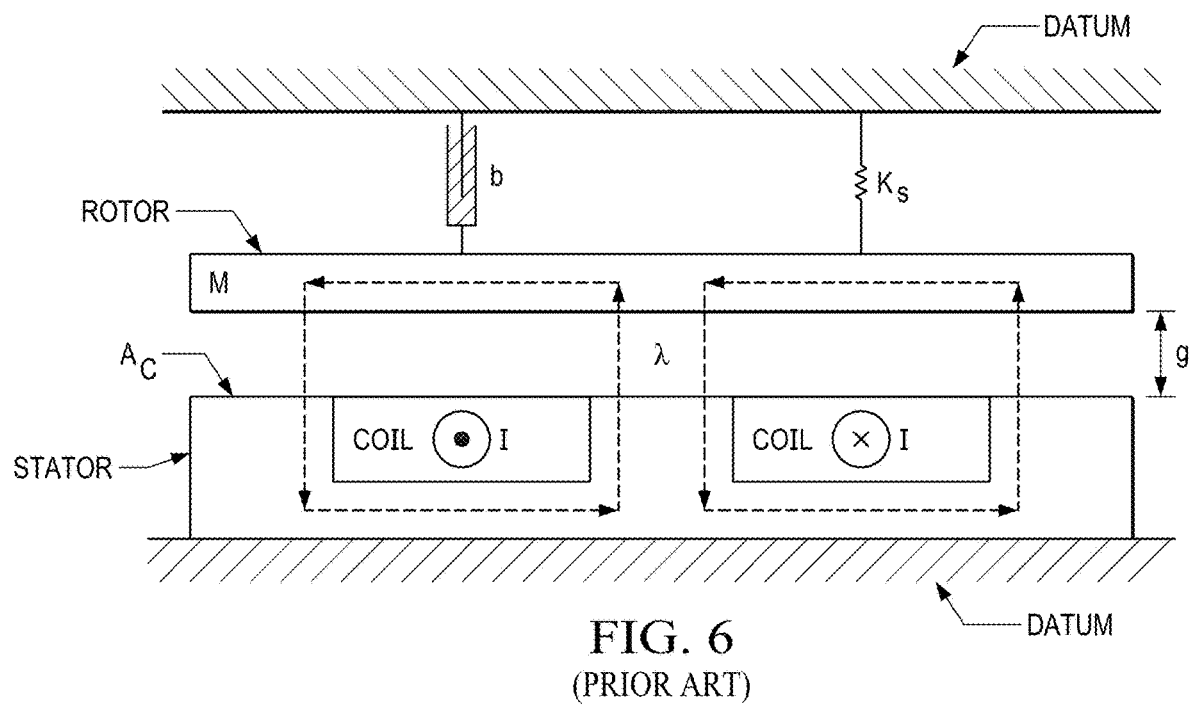
FIG. 6 shows a combination of an electromagnetic system and mechanical system coupled with each other corresponding to a reluctance motor having a driving coil.
Figure 7:
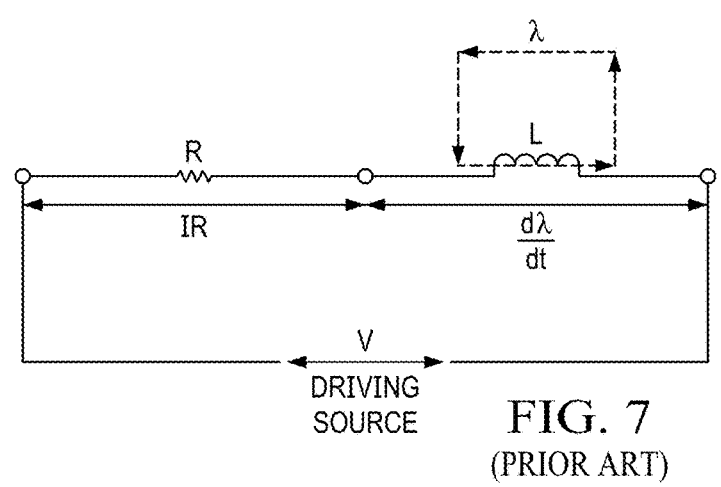
FIG. 7 shows an equivalent electrical circuit of a reluctance motor having a driving coil.

FIG. 1A shows an example of a haptic system 100 including an impedance-estimator module 110 that uses amplitude-modulated calibration signals (e.g., 135). The haptic system 100 includes, in addition to the impedance-estimator module 110, a driver controller 170, and a haptic engine 180. In some implementations, the haptic engine 180 includes a reluctance motor, e.g., like the one described above in connection with FIGS. 6-7. The impedance-estimator module 110 is configured to communicate with the haptic engine 180 and with the driver controller 170. In this manner, the impedance-estimator module 110 suitably receives, from the driver controller 170, a drive signal 174. FIG. 1B shows an example of a drive signal 174 for driving the haptic actuator 180. The drive signal 174 includes a soft-ramp, pre-warm portion 174-SRPW followed by a playback portion 174-PB. Referring again to FIG. 1A, the impedance-estimator module 110 suitably receives, from the haptic engine 180, a monitoring voltage signal 186 and a monitoring current signal 188.

The impedance-estimator module 110 suitably supplies a modified driver signal 114 to the haptic engine 180. While receiving the pre-warm portion 174-SRPW, the impedance-estimator module 110 suitably estimates values of resistance and inductance 117 of a driving coil (e.g., 287) of the haptic engine 180, 280. Additionally, the impedance-estimator module 110 suitably supplies the values of the resistance and the inductance 117 to the driver controller 170 for the latter to adjust at least the playback portion 174-PB of the drive signal.

Note that, e.g., when it is part of a mobile device (e.g., 500), the haptic system 100 is configured to communicate with a host processor 190 of the device. The mobile device can be one of a smartphone, a tablet, a wearable device, or a laptop. The host processor 190 is configured/programmed to provide a target signal 192, e.g., the target gap $g_t$ of the reluctance motor, to the driver controller 170. In turn, the driver controller 170 is configured to produce the driver signal 174 based on the target signal 192 and the values of the resistance and the inductance 117 supplied by the impedance-estimator module 110.

Figure 1C:
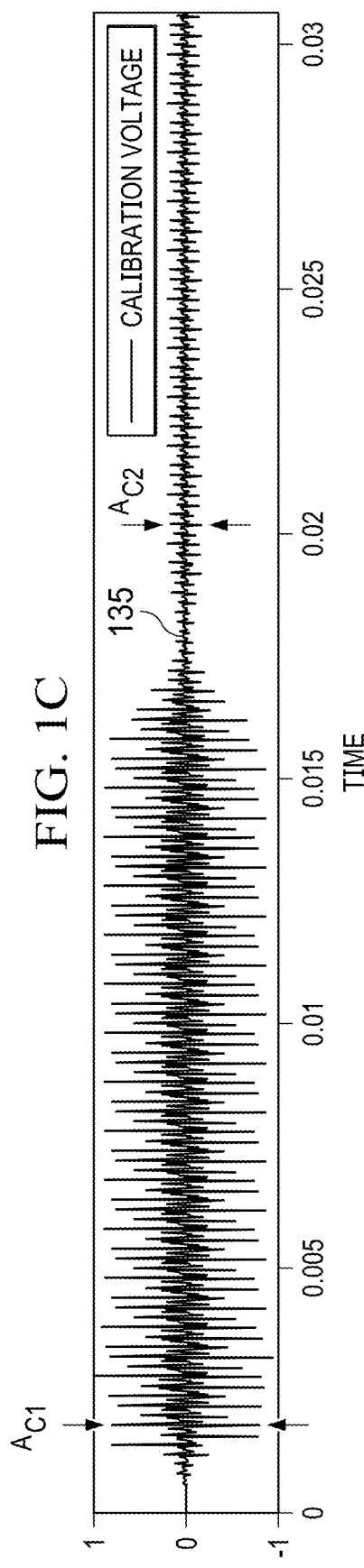
Figure 1D:
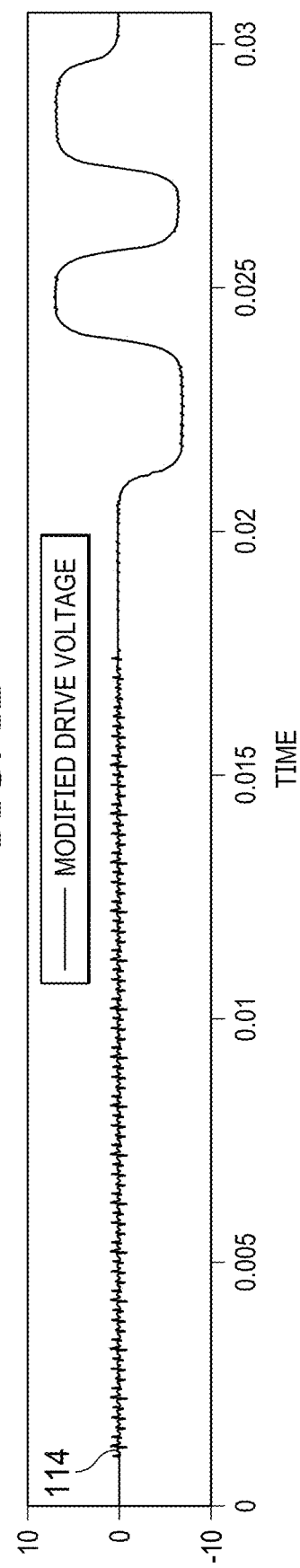
Figure 1E:
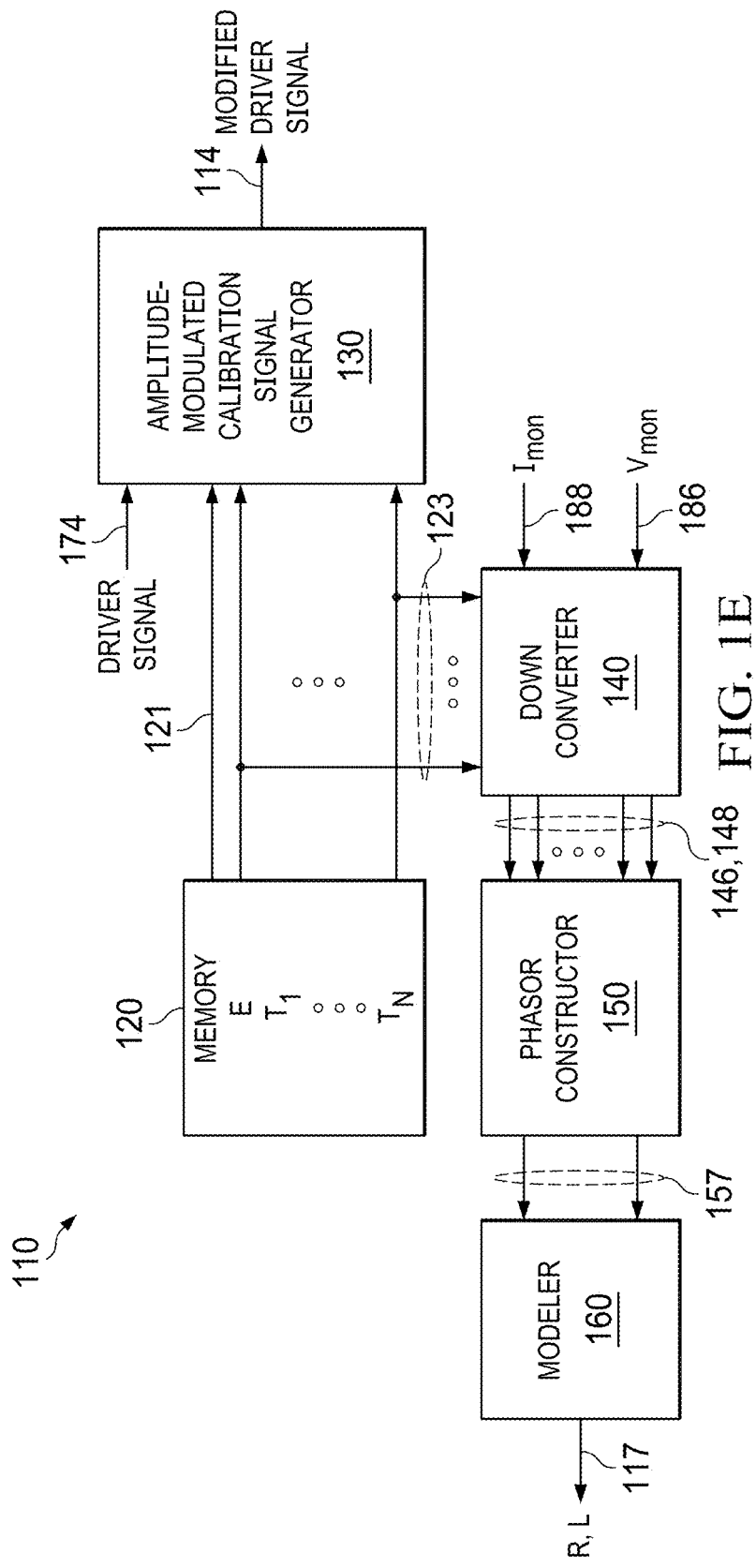
FIG. 1E shows an example of an impedance-estimator that uses amplitude-modulated calibration signals in accordance with the disclosed technologies.
Figure 2B:
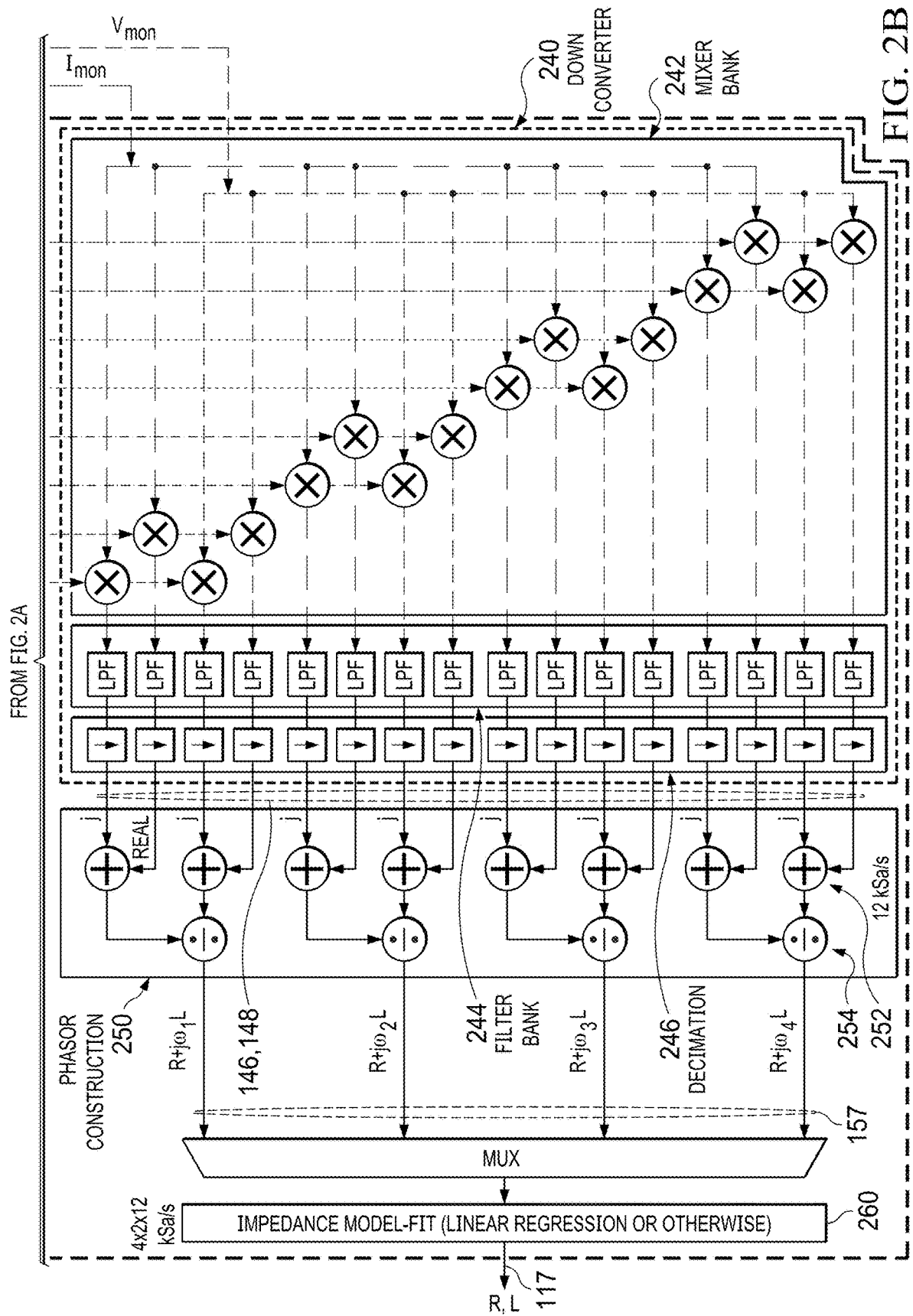
FIG. 2 shows another example of an impedance-estimator that uses amplitude-modulated calibration signals in accordance with the disclosed technologies.

FIG. 1E shows a first example implementation, FIG. 2 shows a second example implementation, of the impedance-estimator module 110/210 that uses amplitude-modulated calibration signals (e.g., 135). Reference to both FIGS. 1E and 2 will be made to describe the components of the impedance-estimator module 110/210.

The impedance-estimator module 110/210 includes signal-generator circuitry 130/230, down-converter circuitry 140/240, phasor-constructor circuitry 150/250, and modeler-circuitry 160/260. In addition, the impedance-estimator module 110 includes a memory bank 120/220. The memory bank 120/220 stores a waveform of an envelope signal 121, and a plurality of waveforms of tones 123, where each tone 123 is a signal having a respective frequency. In some implementations, the stored tones 123 can be circularly looped.

The signal-generator circuitry 130/230, also referred to as amplitude modulated calibration signal generator, includes an adder bank 232 and a variable-gain amplifier 234. The signal-generator circuitry 130/230 is configured to generate an amplitude-modulated calibration signal 135 including one or more tones 123. FIG. 1C shows and example of an amplitude-modulated calibration signal 135. Here, the amplitude-modulated calibration signal 135 has been generated, in part, by summing, using the adder bank 232, four tones 123 stored in the memory bank 120/220.

Also, the variable gain amplifier 234 is configured to retrieve the waveform of the envelope signal 121 from the memory bank 120/220, and vary a gain of the amplifier 234 based on the envelope signal 121 to modulate an amplitude of the sum signal to obtain the amplitude-modulated calibration signal 135. Note that the envelope signal 121 is configured with a first amplitude $A_{C_1}$ over a first time interval $\Delta t_1$ corresponding to the pre-warm portion 174-SRPW of the drive signal, and a second amplitude $A_{C_2}$ over a second time interval $\Delta t_2$ corresponding to the playback portion 174-PB of the drive signal. In other words, the amplitude of the calibration signal 135 is modulated in time domain in the following manner: the calibration signal 135's amplitude is (i) large when the drive signal 174 is small and (ii) small when the drive signal 174 is large. In other embodiments, more than two levels (not including inter-level smoothing) can be used. For example, a third level can be applied when the driver signal 174 is halfway (4V) between minimum (0V) and maximum (8V).

The signal-generator circuitry 130/230 is further configured to modify the drive signal 174 by adding the amplitude-modulated calibration signal 135 to the drive signal 174 to obtain the modified drive signal 114. Notably, the envelope signal 121 is configured to cause the amplitude-modulated calibration signal 135 to have a first amplitude $A_{C_1}$ when the amplitude-modulated calibration signal 135 is added to the pre-warm portion 174-SRPW of the drive signal, and a second amplitude $A_{C_2}$ smaller by a predetermined factor K than the first amplitude $A_{C_1}$ when the amplitude-modulated calibration signal 135 is added to the playback portion 174-PB of the drive signal. The predetermined factor K by which the second amplitude $A_{C_2}$ is smaller than the first amplitude $A_{C_1}$ can be in a range of 2 to 10. FIG. 1D shows the modified drive signal 114 formed by superimposing the amplitude-modulated calibration signal 135 on the drive signal 114. As shown in FIG. 1D, the memory-stored waveform of the envelope 121 is shaped to enable smooth transition of the drive signal 114 from a pre-warm state corresponding to first time interval $\Delta t_1$ to a playback state corresponding to the second time interval $\Delta t_2$. Adaptive filtering can be applied to track the envelope, when it is part of the modified drive signal 114, and, thus, adjust an update rate of resistance estimation.

The modified drive signal 114 shown in FIG. 1D is used by driver circuitry 282 of the haptic engine 180/280 to drive the driving coil 287. Additionally, the modified drive signal 114 can be used for estimating the impedance 117 of the driving coil 287 of the haptic engine 180/280, as described next.

The down-converter circuitry 140/240 is configured to, for each tone 123 of the amplitude-modulated calibration signal 135, retrieve the waveform of the tone 123 from the memory bank 120/220, and down-convert the monitoring voltage signal 186 and the monitoring current signal 188 and based on the retrieved tone 123. Note that voltage and current sensing circuitry 284 of the haptic engine 180/280 is configured to monitor voltage across, and current though, the driving coil 287 as the monitoring voltage signal 186 and the monitoring current signal 188.

The phasor-constructor circuitry 150/250 is configured to, for each tone 123 of the amplitude-modulated calibration signal 135, obtain a corresponding impedance phasor 157 as a ratio of a voltage phasor associated with the down-converted voltage signal 146 and a current phasor associated with the down-converted current signal 148. In the implementation shown in FIG. 2, the phasor-constructor circuitry 150/250 includes an adder bank 252, and a divider bank 254. The latter is used by the phasor-constructor circuitry 150/250 to take the noted ratios.

The modeler-circuitry 160/260 is configured to compute values of the resistance and the inductance 117 of the driving coil 287 by fitting the one or more impedance phasors 157 to a frequency-dependent model of impedance of the driving coil 287. In some implementations, the frequency-dependent model (e.g., 367) of impedance of the driving coil is a linear regression model. As described in detail below in connection with FIGS. 3A-3D, linear regression is performed on the real-time impedance values 157 at each tone's frequency to calculate the resistance of the driving coil 287. In some implementations, the modeler-circuitry 160/260 can calculate the values R, L 117 using a discrete Fourier transform (DFT) process, where the driving coil 287's impedance 157 at one or more frequencies are used to model fit the driving coil 287's empirical impedance via linear regression followed by low-pass filtering.

Components of the down-converter circuitry 140/240 will be described next. The down-converter circuitry 140/240 includes a mixer bank 242, a filter bank 244, and optionally a decimation circuit 246.

In some implementations, the mixer bank 242 is configured to, for each tone of the amplitude-modulated calibration signal 123, retrieve the waveform of the tone 123 from the memory bank 120/220, and mix the monitoring voltage signal 186 and the monitoring current signal 188 with the retrieved tone 123. Further, the filter bank 244 is configured to, for each tone 123 of the amplitude-modulated calibration signal 135, low-pass filter the mixed signal to obtain the down-converted voltage signal 146 and the down-converted current signal 148. When equipped with the decimation circuit 246, the latter is configured to, for each tone 123 of the amplitude-modulated calibration signal 135, decimate the low-pass filtered signal to obtain the down-converted voltage signal 146 and the down-converted current signal 148.

In some implementations, the memory bank 120/220 is configured to store waveforms of in-phase and quadrature instances of the one or more tones 123-I, 123-Q. Here, the mixer bank 242 is configured to, for each tone 123 of the amplitude-modulated calibration signal 135, retrieve the waveforms of the in-phase and quadrature instances of the one or more tones 123-I, 123-Q from the memory bank 120/220, and mix the monitoring voltage signal 186 and the monitoring current signal 188 with the in-phase instance of the tone to obtain an in-phase instance of the mixed signal, and mix the monitoring voltage signal 186 and the monitoring current signal 188 with the quadrature instance of the tone to obtain a quadrature instance of the mixed signal. Further, the low-pass filter bank 244 is configured to, for each tone 123 of the amplitude-modulated calibration signal 135, low-pass filter the in-phase mixed signal to obtain an in-phase instance of the down-converted signal 146, 148, and low-pass filter the quadrature mixed signal to obtain a quadrature instance of the down-converted signal 146, 148. Furthermore, the phasor-constructor circuitry 150/250 is configured to use its adder bank 252 to add the in-phase down-converted voltage signal 146-I and the quadrature down-converted voltage signal 146-Q to obtain a voltage phasor, and add the in-phase down-converted current signal 148-I and the quadrature down-converted current signal 148-Q to obtain a current phasor. The use of in-phase and quadrature components of the down-converted voltage signal 146, and the down-converted current signal 148 ensures avoidance of divide-by-zero situations.

It is noted here that while circular memory banks have been used as an example of digital frequency synthesis in the embodiments described above, it need not be a restricting aspect of the disclosed technologies. For instance, a clock-incremented time counter at predetermined step-sizes (corresponding to desired frequencies) can be provided to a CORDIC (COordinate Rotation DIgital Computer) circuit to compute a corresponding sinusoidal output.

When equipped with the decimation circuit 246, the latter is configured to, for each tone 123 of the amplitude-modulated calibration signal 135, decimate the in-phase low-pass filtered signal to obtain an in-phase down-converted voltage signal 146-I and an in-phase the down-converted current signal 148-I, and decimate the quadrature low-pass filtered signal to obtain a quadrature down-converted voltage signal 146-Q and a quadrature down-converted current signal 148-Q.

The higher calibration voltage applied during pre-warm allows fast resistance estimation without the power penalties associated with drive voltage bias. When waveform playback starts, the calibration tone is attenuated to avoid power penalty, but the resistance update rate can be much slower at this point since the thermal response of copper is low in bandwidth for most typical engine surface to volume ratios. Thus in some cases, the impedance-estimator module 110/210 is configured to continue the estimation of the resistance and the inductance 117 of the driving coil 287 while receiving the playback portion 174-PB.

The impedance-estimator module 110/210 can be implemented on an integrated circuit (IC) chip. In this manner, the components 120-160 are integrated on the same chip. In some implementations, the driver controller 170 can be integrated on the same chip as the impedance-estimator module 110/210. In some implementations, one or both of the driver circuitry 282 and voltage and current sensing circuitry 284 of the haptic engine 180/280 can be integrated on the same as the impedance-estimator module 110/210.

Implementation of the disclosed technologies to reluctance actuators is described next. FIGS. 3A-3D show aspects of characterization of a frequency dependent model 367 of impedance of a driving coil of a reluctance motor.

The measured impedance model is not a R+jωL type of model. This can be due to a combination of eddy current and skin effect in the attraction plate of a reluctance motor. Based on the schematic shown in FIG. 3A, the impedance model 367 is:

$$r_E(\omega) = A + B\sqrt{\omega}, \quad (5)$$

$$\frac{1}{L(\omega)} = C + D\omega, \quad (6)$$

Figure 3A:
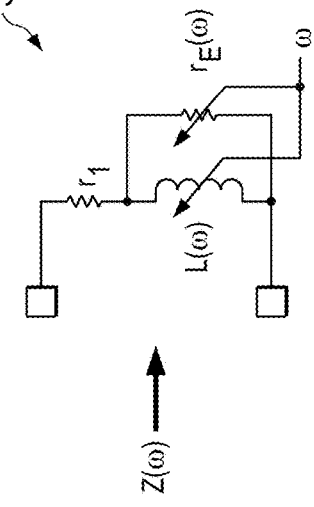
FIGS. 3A-3D show aspects of characterization of a frequency dependent model of impedance of a driving coil of a haptic actuator.
Figure 3B:
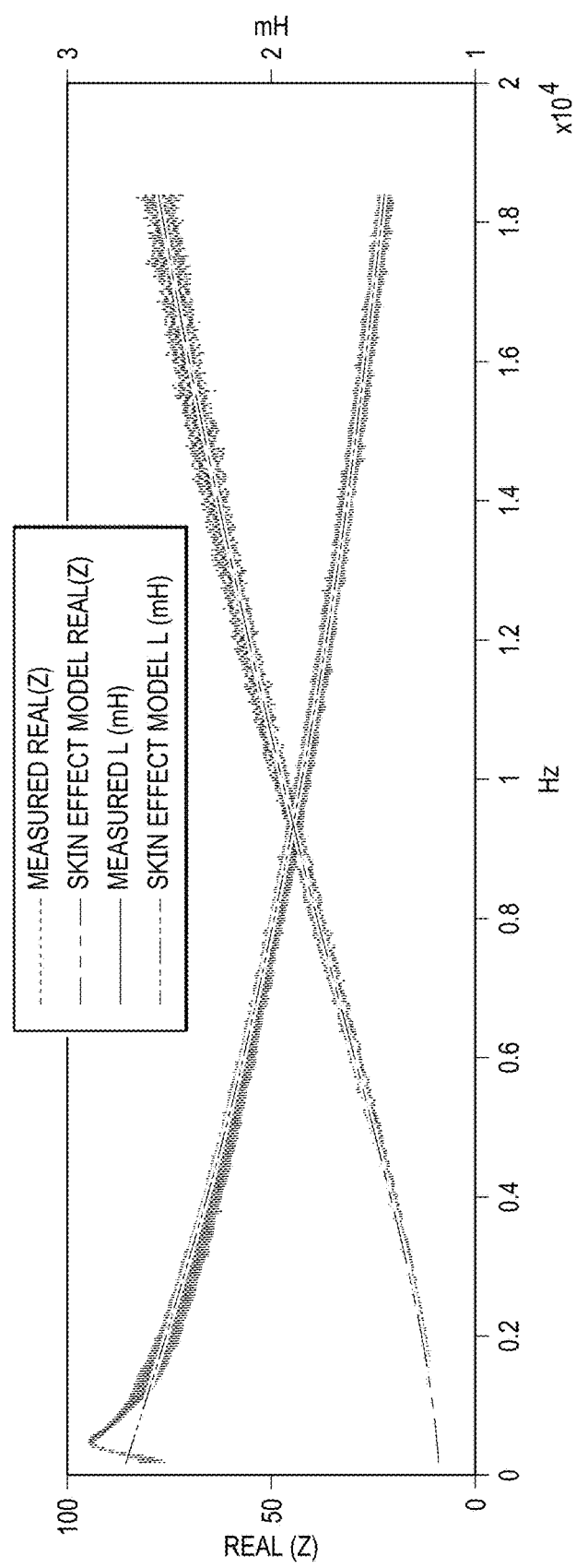
Figure 3C:
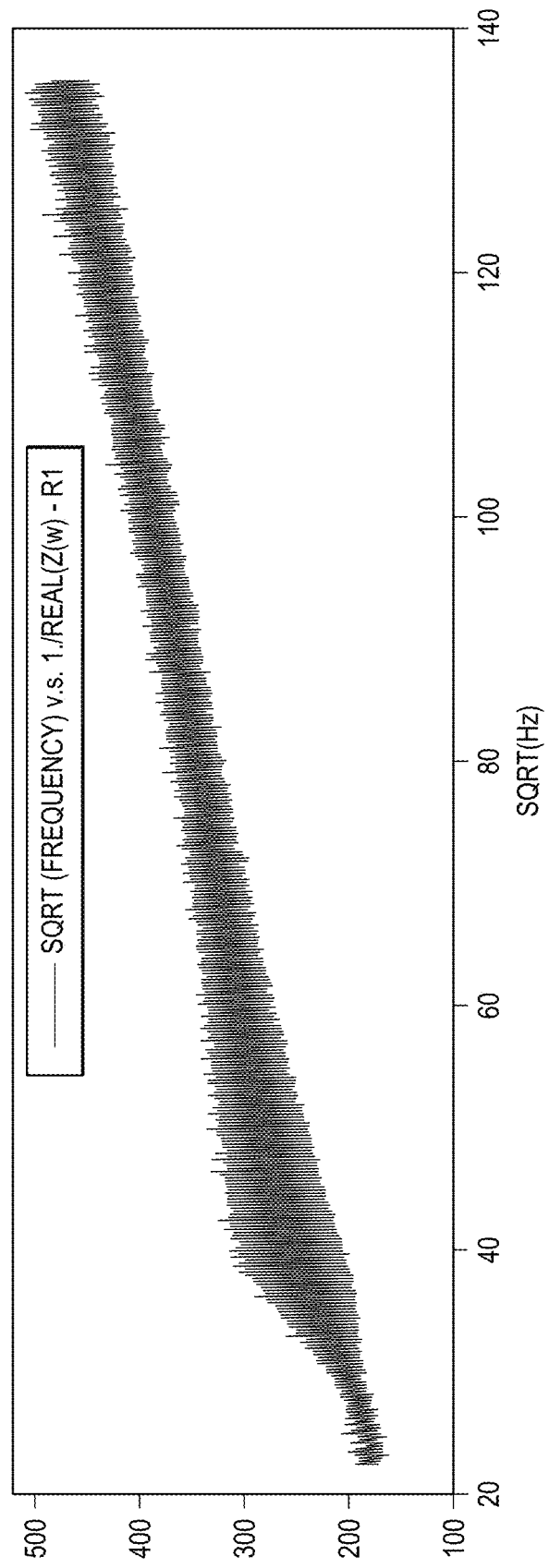
Figure 3D:
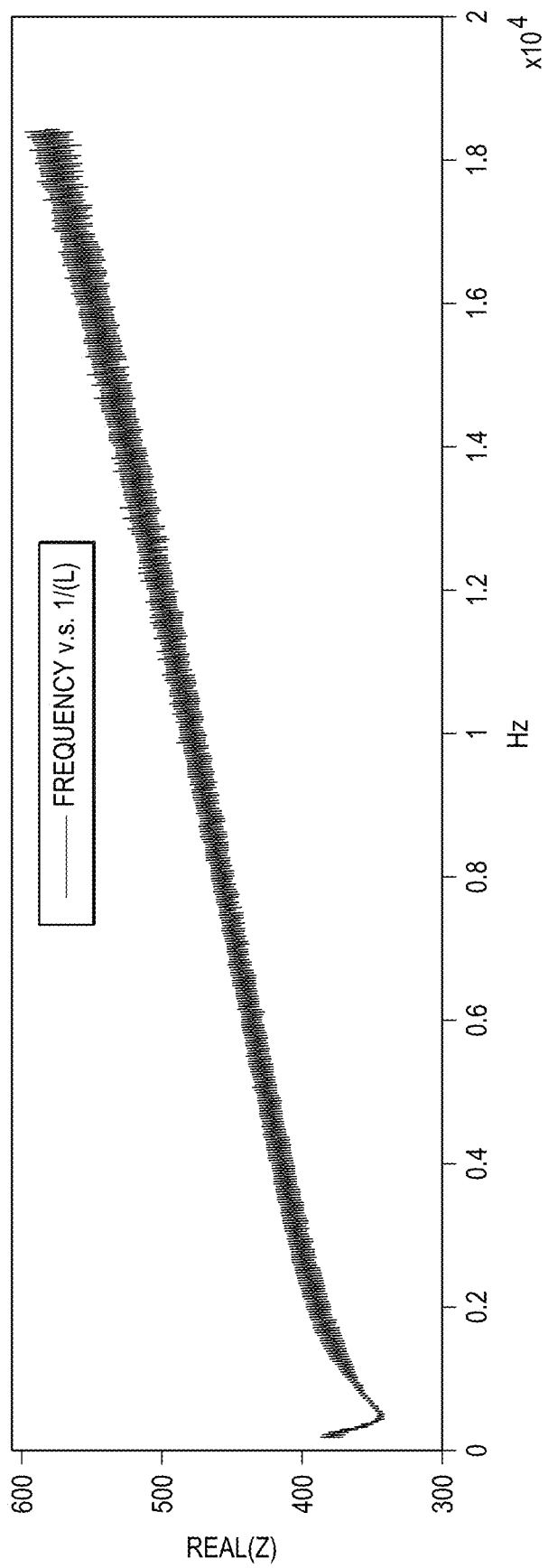

A model characterization signal is a 4 Vpp chirp from 50 Hz to 20 kHz, as shown in FIGS. 3B-3D. FIG. 3B shows dependence of the coil resistance on frequency, in accordance with EQ. (5), and dependence of the coil inductance on frequency, in accordance with EQ. (6). FIG. 3C shows dependence of the coil resistance on the square root of frequency, in accordance with EQ. (5). And FIG. 3D shows dependence of the inverse of the coil inductance on the frequency, in accordance with EQ. (6).

Figure 4A:
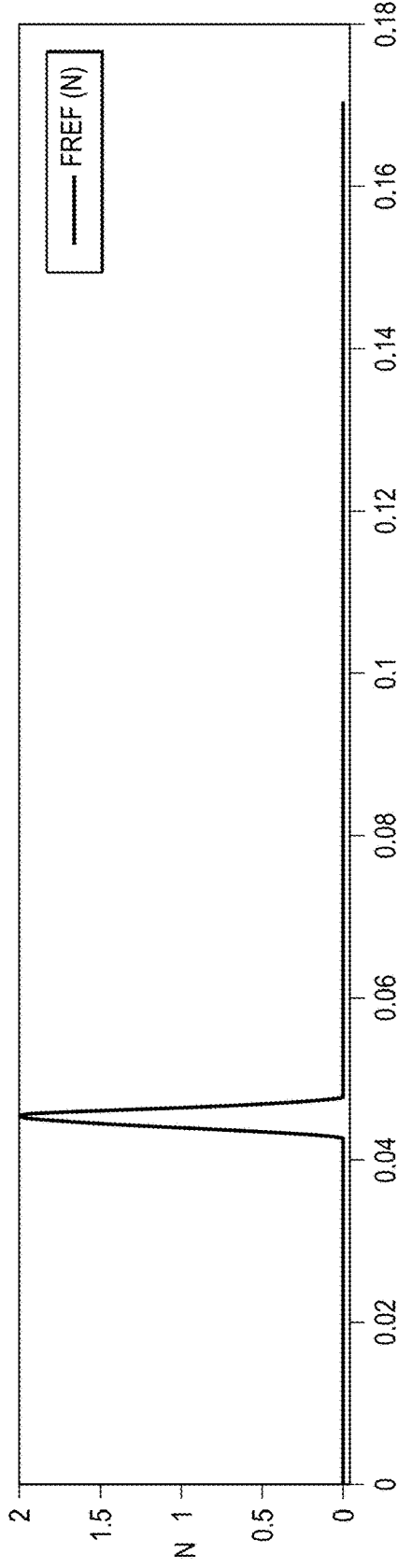
FIGS. 4A-4F show aspects of activating a reluctance motor in accordance with the disclosed technologies.
Figure 4B:
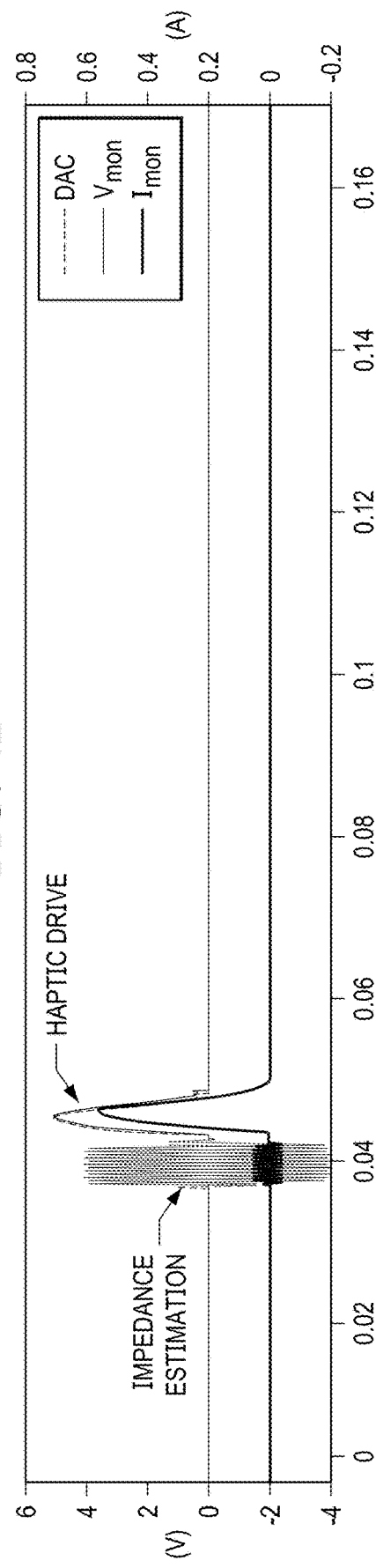
Figure 4C:
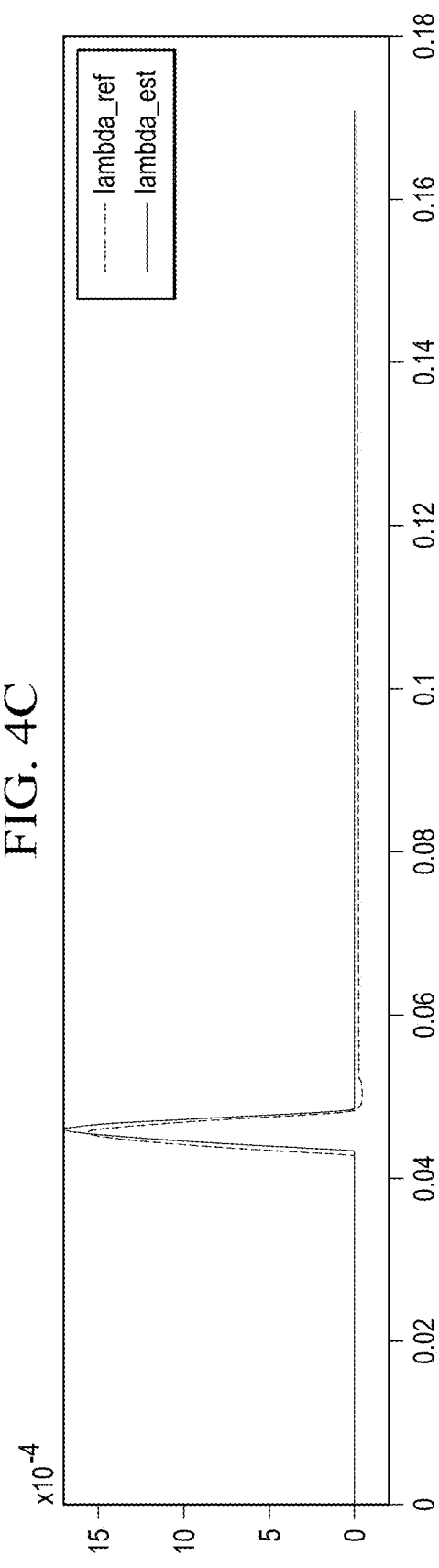
Figure 4D:
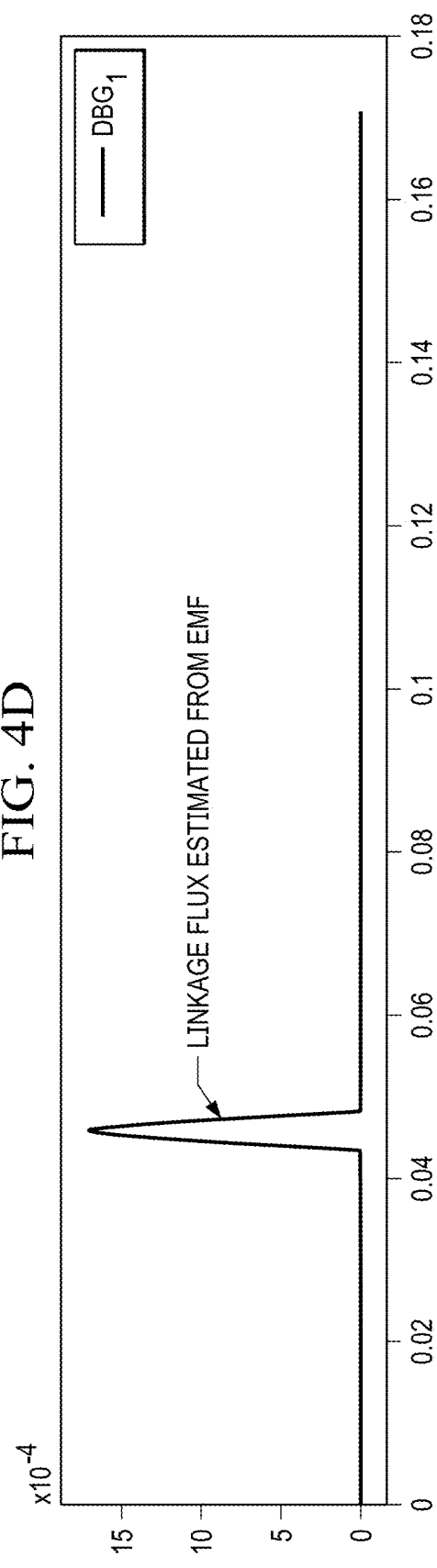

FIGS. 4A-4F show aspects of activating a reluctance motor in accordance with the disclosed technologies. Impedance model 367 was used to fit measurement results once the frequency dependencies of the resistance and inductance are taken into account, as shown in FIGS. 4B-4D.

Figure 4E:
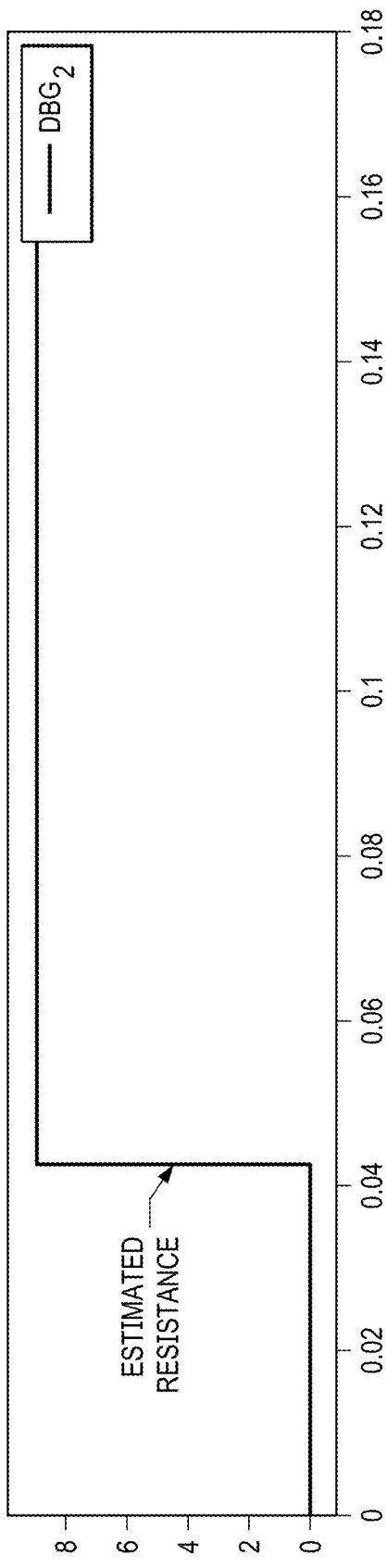
Figure 4F:
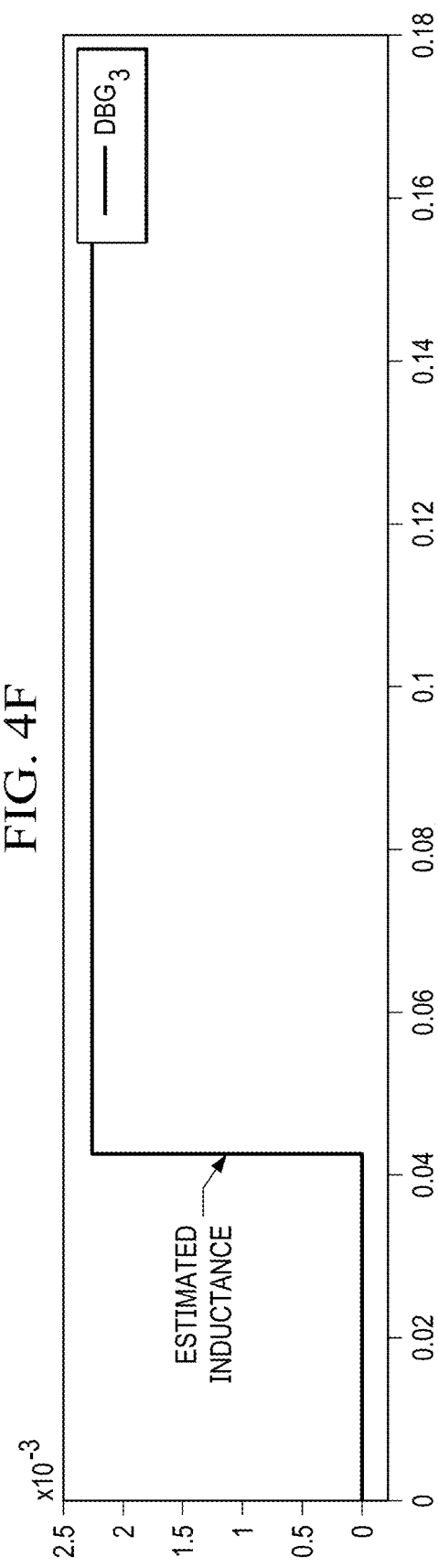

The ground truth of coil resistance, measured with a digital multi-meter (DMM), is 8.51 Ohms, and LCR measurement of coil inductance is 2.428 mH at 1 kHz. The impedance model 367 with data in FIG. 3B estimates $r_1$ to be 8.51 Ohm at DC, and $L(\omega)$ to be 2.6 mH at 1 kHz, and 2.73 mH at DC. FIG. 4E and FIG. 4F show the enveloped calibration signal 135 at 6 kHz estimates R(j37699) to be 9 Ohm, and L(j 37699) to be 2.3 mH respectively which agrees with the impedance model 367.

FIG. 5 is an example mobile device architecture that uses the haptic system 100 described in reference to FIGS. 1-4, according to an embodiment. Architecture 500 may be implemented in any mobile device for generating the features and processes described in reference to FIGS. 1-4, including but not limited to smart phones and wearable computers (e.g., smart watches, fitness bands). Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor(s) 510, light sensor 512, and proximity sensor 514 may be coupled to peripherals interface 506 to facilitate orientation, lighting, and proximity functions of the device. For example, in some embodiments, light sensor 512 may be utilized to facilitate adjusting the brightness of touch surface 546. In some embodiments, motion sensor(s) 510 (e.g., an accelerometer, rate gyroscope) may be utilized to detect movement and orientation of the device. Accordingly, display objects or media may be presented according to a detected orientation (e.g., portrait or landscape).

Haptic engine 517, under the control of haptic engine instructions 572, provides the features and performs the processes described in reference to FIGS. 1-4, such as, for example, implementing haptic feedback (e.g., vibration). Haptic engine 517 can include one or more actuators, such as piezoelectric transducers, electromechanical devices, and/or other vibration inducing devices, which are mechanically connected to an input surface (e.g., touch surface 46). Drive electronics (e.g., 230) coupled to the one or more actuators cause the actuators to induce a vibratory response into the input surface, providing a tactile sensation to a user touching or holding the device.

Other sensors may also be connected to peripherals interface 506, such as a temperature sensor, a barometer, a biometric sensor, or other sensing device, to facilitate related functionalities. For example, a biometric sensor can detect fingerprints and monitor heart rate and other fitness parameters. In some implementations, a Hall sensing element in haptic engine 517 can be used as a temperature sensor.

Location processor 515 (e.g., GNSS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used to support an electronic compass application.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communications functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 524 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 526 may be coupled to a speaker 528 and one or more microphones 530 to facilitate voice-enabled functions, such as voice recognition, voice replication, digital recording, and telephony functions. In an embodiment, audio subsystem includes a digital signal processor (DSP) that performs audio processing, such as implementing codecs.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 546. In one embodiment, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some embodiments, device 500 may present recorded audio and/or video files, such as MP3, AAC, and MPEG video files. In some embodiments, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, iOS, WINDOWS, or an embedded operating system such as VxWorks. Operating system 552 may include instructions for handling basic system services and for performing hardware dependent tasks. In some embodiments, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device.

Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS (e.g., GPS, GLOSSNAS) and navigation-related processes and functions; camera instructions 570 to facilitate camera-related processes and functions; and haptic engine instructions 572 for commanding or controlling haptic engine 517 and to provide the features and performing the processes described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C# and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A haptic system comprising:
an impedance-estimator module configured to
communicate with a haptic engine and with a driver controller;
receive, from the driver controller, a drive signal comprising a pre-warm portion followed by a playback portion, and, from the haptic engine, a monitoring voltage signal and a monitoring current signal; and
supply a modified driver signal to the haptic engine,
while receiving the pre-warm portion, estimate values of resistance and inductance of a driving coil of the haptic engine, and
supply the values of the resistance and the inductance to the driver controller for adjusting at least the playback portion of the drive signal,
wherein the impedance-estimator module comprises
a) signal-generator circuitry configured to
generate an amplitude-modulated calibration signal comprising one or more tones, wherein each tone is a signal having a respective frequency;
modify the drive signal by adding the amplitude-modulated calibration signal to the drive signal, wherein the amplitude-modulated calibration signal has
a first amplitude when the amplitude-modulated calibration signal is added to the pre-warm portion of the drive signal,
a second amplitude smaller by a predetermined factor than the first amplitude when the amplitude-modulated calibration signal is added to the playback portion of the drive signal, and
zero, one or more other amplitudes that (i) differ from the first and second amplitudes, and (ii) depend on a drive amplitude of the drive signal;
b) down-converter circuitry configured to, for each tone of the amplitude-modulated calibration signal, down-convert the current signal and the voltage signal based on the tone;
c) phasor-constructor circuitry configured to, for each tone of the amplitude-modulated calibration signal, obtain a corresponding complex impedance phasor as a ratio of the down-converted voltage signal and the down-converted current signal, and
d) modeler-circuitry configured to compute the resistance and the inductance of the driving coil by fitting the one or more impedance phasors to a frequency-dependent model of impedance of the driving coil.

2. The haptic system of claim 1, wherein
the impedance-estimator module comprises a memory bank configured to store the one or more tones, and
the down converter circuitry is configured to, for each tone of the amplitude-modulated calibration signal, retrieve the tone from the memory bank.

3. The haptic system of claim 1, wherein the down converter circuitry comprises
a mixer bank configured to, for each tone of the amplitude-modulated calibration signal, mix the sensed signal with the tone, and
a low-pass filter bank configured to, for each tone of the amplitude-modulated calibration signal, filter the mixed signal to obtain the down-converted signal.

4. The haptic system of claim 3, wherein the down converter circuitry comprises
a decimation circuit configured to, for each tone of the amplitude-modulated calibration signal, decimate a low-pass filtered signal to obtain the down-converted signal.

5. The haptic system of claim 1, wherein
the down converter circuitry comprises
a mixer bank configured to, for each tone of the amplitude-modulated calibration signal,
mix the sensed signal with an in-phase instance of the tone to obtain an in-phase instance of the mixed signal, and
mix the sensed signal with a quadrature instance of the tone to obtain a quadrature instance of the mixed signal,
a low-pass filter bank configured to, for each tone of the amplitude-modulated calibration signal,
filter the in-phase mixed signal to obtain an in-phase instance of the down-converted signal, and
filter the quadrature mixed signal to obtain an quadrature instance of the down-converted signal, and
the phasor-constructor circuitry is configured to
add the in-phase down-converted voltage signal and the quadrature down-converted voltage signal to obtain the down-converted complex voltage phasor, and
add the in-phase down-converted current signal and the quadrature down-converted current signal to obtain the down-converted complex current phasor.

6. The haptic system of claim 5, wherein
the impedance-estimator module comprises a memory bank configured to store in-phase and quadrature instances of the one or more tones, and
the mixer bank is configured to, for each tone of the amplitude-modulated calibration signal, retrieve the one or more instances of the in-phase tone and the quadrature tone from the memory bank.

7. The haptic system of claim 5, wherein the down converter circuitry comprises
a decimation circuit configured to, for each tone of the amplitude-modulated calibration signal,
decimate an in-phase low-pass filtered signal to obtain an in-phase instance of the down-converted signal, and
decimate a quadrature low-pass filtered signal to obtain a quadrature instance of the down-converted signal.

8. The haptic system of claim 1, wherein the frequency-dependent model of impedance of the driving coil is a linear regression model.

9. The haptic system of claim 1, wherein
the impedance-estimator module comprises a memory bank configured to store a plurality of the tones and an envelope signal, and
the signal-generator circuitry comprises
an adder bank configured to
retrieve the tones from the memory bank, and
add the tones to obtain a sum signal, and
a variable gain amplifier configured to
retrieve the envelope signal from the memory bank, and
vary a gain of the amplifier based on the envelope signal to modulate the amplitude of the sum signal to obtain the amplitude-modulated calibration signal.

10. The haptic system of claim 9, wherein the envelope signal is configured with a first amplitude over a first time interval corresponding to the pre-warm portion of the drive signal, and a second amplitude over a second time interval corresponding to the playback portion of the drive signal, and optionally a plurality of amplitudes thereafter according to a drive amplitude of the drive signal.

11. The haptic system of claim 9, wherein the predetermined factor by which the second amplitude is smaller than the first amplitude is in a range of 2-10.

12. The haptic system of claim 1, wherein the playback portion of the drive signal received from the driver controller has a drive amplitude, and the first amplitude is smaller than the drive amplitude by a second predetermined factor.

13. The haptic system of claim 12, wherein the second predetermined factor by which the first amplitude is smaller than the drive amplitude is in a range of 2-10.

14. The haptic system of claim 1, wherein the impedance-estimator module is configured to continue the estimation of the resistance and the inductance of the driving coil while receiving the playback portion.

15. The haptic system of claim 1, further comprising the driver controller.

16. The haptic system of claim 15, further comprising
   driver circuitry of the haptic engine configured to drive the driving coil using the modified drive signal; and
   voltage and current sensing circuitry of the haptic engine configured to monitor voltage across, and current though, the driving coil as the monitoring voltage signal and the monitoring current signal.

17. A method comprising:
   generating an amplitude-modulated calibration signal comprising one or more tones, wherein each tone is a signal having a respective frequency;
   receiving, from a driver controller, a drive signal comprising a pre-warm portion followed by a playback portion;
   modifying the drive signal by adding the amplitude-modulated calibration signal to the drive signal, wherein the amplitude-modulated calibration signal has
      a first amplitude when the amplitude-modulated calibration signal is added to the pre-warm portion of the drive signal, and
      one or more second amplitudes that are smaller by respective predetermined factors than the first amplitude when the amplitude-modulated calibration signal is added to the playback portion of the drive signal, where the one or more second amplitudes of the calibration signal depend on a drive amplitude of the drive signal;
   supplying the modified drive signal to a haptic actuator;
   while receiving the pre-warm portion, determining resistance and inductance of a driving coil of the haptic actuator by
      receiving, from the haptic actuator, a current signal through, and a voltage signal across, the driving coil;
      for each tone of the amplitude-modulated calibration signal,
      down-converting the current signal and the voltage signal based on the tone, and
      obtaining a corresponding impedance phasor as a ratio of the down-converted voltage signal and the down-converted current signal;
      computing the resistance and the inductance of the driving coil by fitting the one or more impedance phasors to a frequency-dependent model of impedance of the driving coil; and
      providing the resistance and the inductance of the driving coil to the driver controller for adjusting at least the playback portion of the drive signal.

18. The method of claim 17, wherein, for each tone of the amplitude-modulated calibration signal, down-converting a sensed signal (i.e., the current signal or the voltage signal) based on the tone comprises
   mixing the sensed signal with the tone, and
   low-pass filtering the mixed signal to obtain the down-converted signal.

19. The method of claim 18, wherein, for each tone of the amplitude-modulated calibration signal, mixing the sensed signal with the tone comprises retrieving the tone from local storage.

* * * * *